United States Patent
Kikuchi et al.

(10) Patent No.: US 9,187,080 B2
(45) Date of Patent: Nov. 17, 2015

(54) CONTROL APPARATUS FOR VEHICLE
(71) Applicant: NISSAN MOTOR CO., LTD., Kanagawa (JP)
(72) Inventors: Hironobu Kikuchi, Isehara (JP); Katsuhiko Hirayama, Isehara (JP)
(73) Assignee: NISSAN MOTOR CO., LTD., Kanagawa (JP)
( * ) Notice: Subject to any disclaimer, the term of this patent is extended or adjusted under 35 U.S.C. 154(b) by 0 days.
(21) Appl. No.: 14/366,547
(22) PCT Filed: Dec. 28, 2012
(86) PCT No.: PCT/JP2012/084052
§ 371 (c)(1),
(2) Date: Jun. 18, 2014
(87) PCT Pub. No.: WO2013/100122
PCT Pub. Date: Jul. 4, 2013
(65) Prior Publication Data
US 2014/0358373 A1 Dec. 4, 2014
(30) Foreign Application Priority Data Dec. 28, 2011 (JP) ................................. 2011-290154
Dec. 28, 2011 (JP) ................................. 2011-290155

(51) Int. Cl.
B60W 30/02 (2012.01)
B60G 17/0185 (2006.01)
(Continued)
(52) U.S. Cl.
CPC ............. *B60W 10/18* (2013.01); *B60G 17/015* (2013.01); *B60G 17/016* (2013.01); *B60G 17/0185* (2013.01); *B60G 17/0195* (2013.01); *B60T 8/1755* (2013.01); *B60T 8/17555* (2013.01);
(Continued)

(58) Field of Classification Search
CPC ... B60W 30/025; B60W 40/11; B60W 10/04; B60W 10/18; B60W 10/184; B60W 10/188; B60G 17/0185; B60T 8/1755; B60T 8/17555
USPC .......................................................... 701/38
See application file for complete search history.

(56) References Cited

U.S. PATENT DOCUMENTS 5,032,997 A * 7/1991 Kawagoe ........................ 701/48
7,245,995 B2 * 7/2007 Kueperkoch et al. ........ 701/29.2
(Continued)

FOREIGN PATENT DOCUMENTS

JP       07-117435 A     5/1995
JP       2003-112620 A   4/2003
(Continued)

OTHER PUBLICATIONS

JPO machine translation of JP 2005-162021 (original JP document published Jun. 23, 2005).*

*Primary Examiner* — Behrang Badii
*Assistant Examiner* — David Testardi
(74) *Attorney, Agent, or Firm* — Young, Basile, Hanlon & MacFarlane, P.C.

(57) ABSTRACT

A control apparatus for a vehicle is configured to detect an abnormality of shock absorbers. When an abnormality detection means has detected an abnormality, braking/driving force posture control amount computation means computes an amount of braking/driving force posture control controlled by means of braking/driving force of the vehicle on the basis of target posture control amount.

16 Claims, 16 Drawing Sheets

(51) Int. Cl.
- *B60W 10/18* (2012.01)
- *B60W 40/11* (2012.01)
- *B60W 50/029* (2012.01)
- *B60G 17/0195* (2006.01)
- *B60W 10/04* (2006.01)
- *B60W 10/22* (2006.01)
- *B60T 8/1755* (2006.01)
- *B60G 17/015* (2006.01)
- *B60G 17/016* (2006.01)

(52) U.S. Cl.
CPC ............... *B60W 10/04* (2013.01); *B60W 10/22* (2013.01); *B60W 30/02* (2013.01); *B60W 30/025* (2013.01); *B60W 40/11* (2013.01); *B60W 50/029* (2013.01); *B60G 2400/106* (2013.01); *B60G 2400/30* (2013.01); *B60G 2400/91* (2013.01); *B60G 2500/10* (2013.01); *B60G 2600/08* (2013.01); *B60G 2800/01* (2013.01); *B60G 2800/162* (2013.01); *B60G 2800/80* (2013.01); *B60G 2800/922* (2013.01); *B60G 2800/94* (2013.01); *B60G 2800/95* (2013.01); *B60T 2260/06* (2013.01); *B60W 2720/16* (2013.01)

(56) References Cited

U.S. PATENT DOCUMENTS

| | | | |
|---|---|---|---|
| 7,373,236 B2 * | 5/2008 | Matsuno et al. | 701/80 |
| 7,613,557 B2 * | 11/2009 | Iyoda | 701/48 |
| 7,706,941 B2 * | 4/2010 | Majersik et al. | 701/37 |
| 7,739,010 B2 * | 6/2010 | Koo | 701/37 |
| 7,912,610 B2 * | 3/2011 | Saito et al. | 701/48 |
| 8,229,642 B2 * | 7/2012 | Post et al. | 701/91 |
| 2005/0222717 A1 * | 10/2005 | Erban et al. | 701/1 |
| 2005/0228565 A1 * | 10/2005 | Lohner et al. | 701/41 |
| 2007/0150116 A1 * | 6/2007 | Schwarz et al. | 701/1 |
| 2011/0202237 A1 * | 8/2011 | Lauer et al. | 701/38 |
| 2012/0078470 A1 * | 3/2012 | Hirao et al. | 701/38 |
| 2014/0309902 A1 * | 10/2014 | Katsuyama | 701/70 |

FOREIGN PATENT DOCUMENTS

| | | | | |
|---|---|---|---|---|
| JP | 2005162021 A | * | 6/2005 | ............ B60G 17/00 |
| JP | 2006021742 A | * | 1/2006 | |
| JP | 2006-335193 A | | 12/2006 | |
| JP | 2006341673 A | * | 12/2006 | |
| JP | 2007-246058 A | | 9/2007 | |
| JP | 2007246058 A | * | 9/2007 | |
| JP | 2010241430 A | * | 10/2010 | |
| JP | 2011031739 A | * | 2/2011 | |

\* cited by examiner

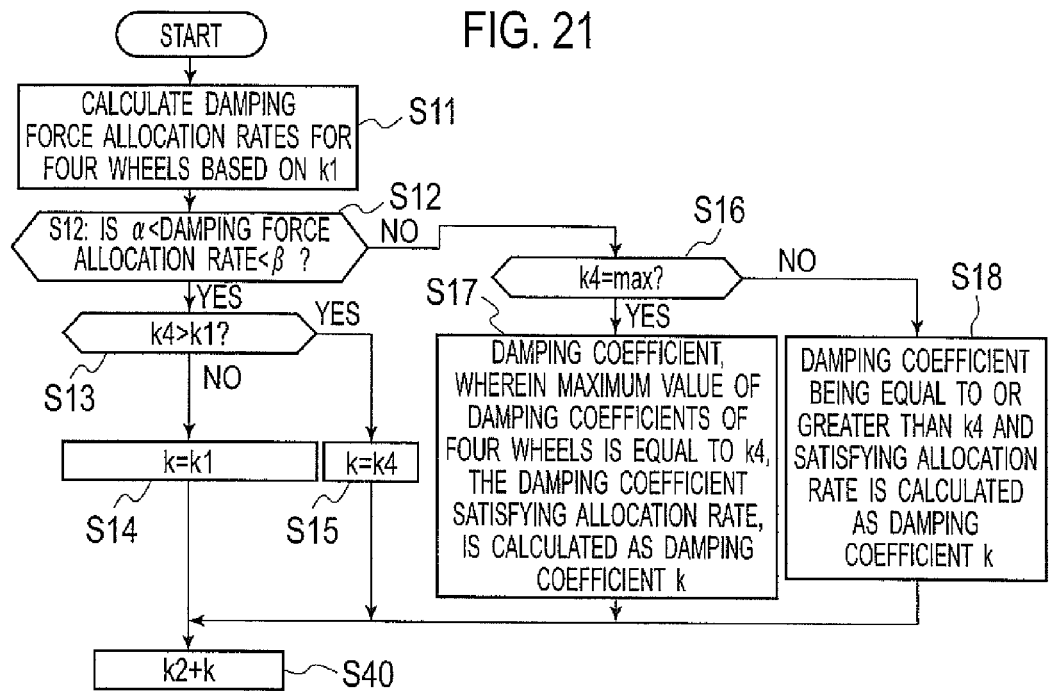
FIG. 21
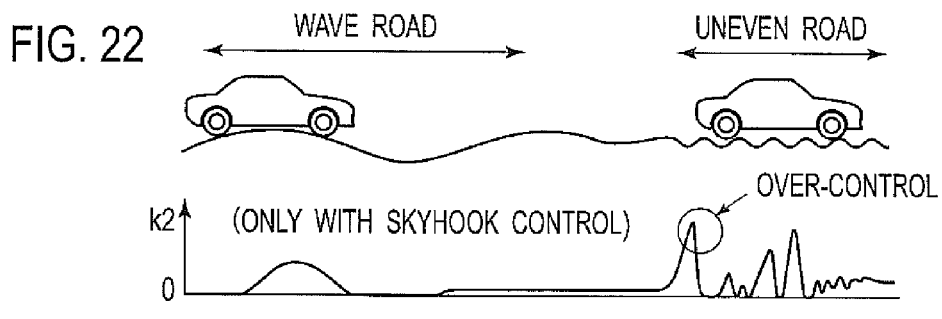
FIG. 22
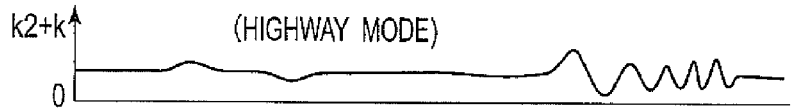
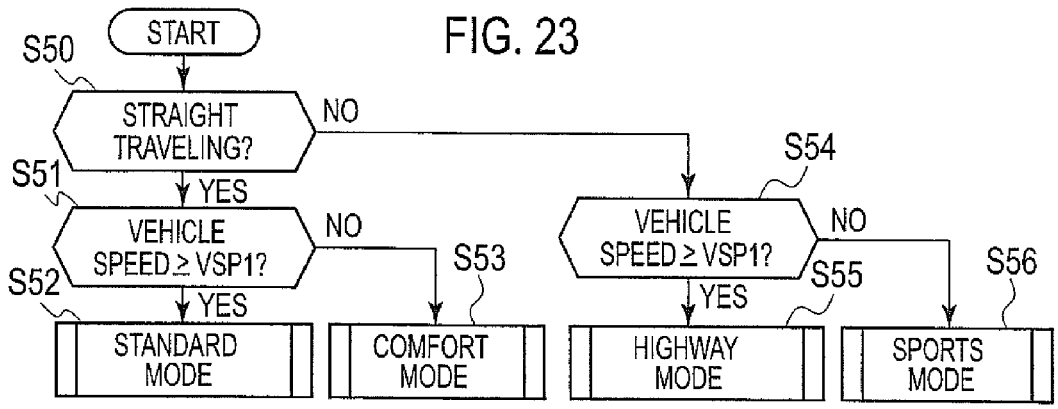
FIG. 23

CONTROL APPARATUS FOR VEHICLE

CROSS REFERENCE TO RELATED APPLICATIONS

The present application claims priority to Japanese Patent Application Nos. 2011-290154, filed Dec. 28, 2011; and 2011-290155, filed Dec. 28, 2011; each incorporated herein in its entirety.

TECHNICAL FIELD

The present invention relates to a control apparatus configured to control a state of a vehicle.

BACKGROUND

As a technique related to a control apparatus for a vehicle, Japanese Patent Application Laid-Open No. 7-117435 discloses a technique of controlling a vehicle body attitude using a suspension control apparatus capable of changing a damping force.

However, if a vehicle body attitude is controlled only by a damping force of a shock absorber, the damping force cannot be generated when the shock absorber fails, and thus the vehicle body attitude might not be controlled.

BRIEF SUMMARY

The present invention has been made in view of the above-described problem, and aims to provide a control apparatus for a vehicle capable of controlling a vehicle body attitude even when the shock absorber fails.

In order to achieve the above-described purpose, a control apparatus for a vehicle according to the present invention includes: a braking/driving force attitude control amount calculation unit configured to calculate a braking/driving force attitude control amount controlled by a braking/driving force of the vehicle so that an attitude of a vehicle body becomes a target attitude; and a damping force control unit configured to control a damping force of a shock absorber based on the braking/driving force attitude control amount; and further includes: a traveling state detector configured to detect a traveling state of a vehicle; a target attitude control amount calculation unit configured to calculate a target attitude control amount of the vehicle body based on the traveling state; and an abnormality detector configured to detect an abnormality of the shock absorber, wherein upon detection of an abnormality by the abnormality detector, the braking/driving force attitude control amount calculation unit calculates the braking/driving force attitude control amount controlled by the braking/driving force of the vehicle, based on the target attitude control amount.

That is, even when an abnormality occurs in a variable damping force shock absorber, the vehicle body attitude can be controlled using the braking/driving force attitude control amount.

BRIEF DESCRIPTION OF DRAWINGS

FIG. 21 is a flowchart illustrating the damping coefficient arbitration processing in a highway mode according to the first embodiment.

FIG. 22 is a time chart illustrating changes of the damping coefficient when traveling on a wave road surface and an uneven road surface.

FIG. 23 is a flowchart illustrating mode selection processing based on a traveling state in a damping coefficient arbitration unit according to the first embodiment.

DESCRIPTION OF EMBODIMENTS

Figure 1:
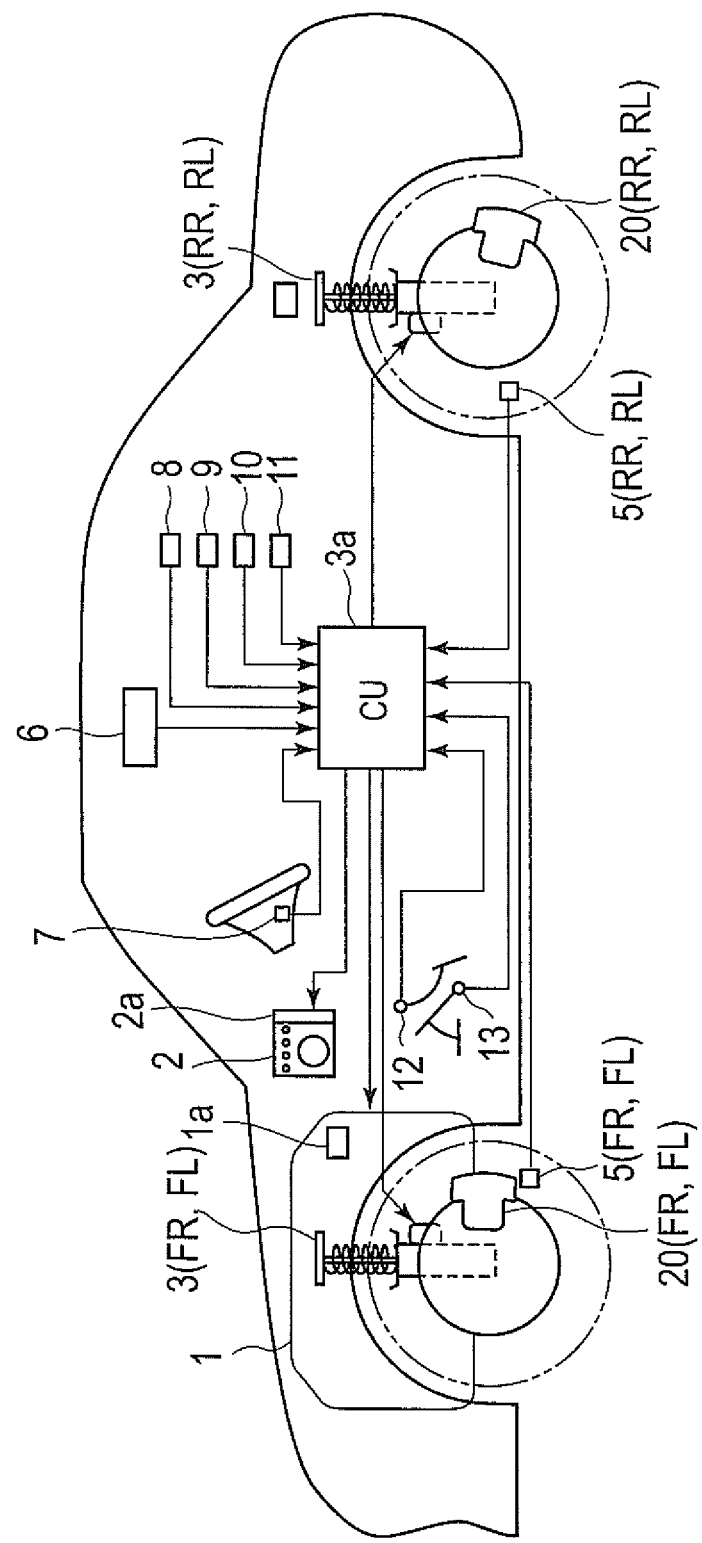
FIG. 1 is a system schematic view illustrating a control apparatus for a vehicle according to a first embodiment.

FIG. 1 is a system schematic view illustrating a control apparatus for a vehicle according to a first embodiment. The vehicle includes an engine 1 serving as a driving power source, brakes 20 (hereinafter, when a brake corresponding to an individual wheel is displayed, described as a right front-wheel brake: 20FR, a left front-wheel brake: 20FL, a right rear-wheel brake: 20RR, and a left rear-wheel brake: 20RL) each of which generates braking torque due to a frictional force to each wheel, shock absorbers 3 each of which is provided between each wheel and a vehicle body and can control a damping force in an adjustable manner (hereinafter, described as S/A, and when an S/A corresponding to an individual wheel, the S/A is described as a right front-wheel S/A 3FR, a left front-wheel S/A 3FL, a right rear-wheel S/A 3RR, and a left rear-wheel S/A 3RL).

The engine 1 includes an engine controller (hereinafter, referred to as also an engine control unit) 1a configured to control torque outputted from the engine 1. The engine controller 1a controls the degree of opening of a throttle valve, the fuel injection quantity, ignition timing, and the like, of the engine 1, to control a desired engine operation state (the engine speed or the engine output torque).

Moreover, the brake 20 generates a braking torque based on a hydraulic pressure supplied from a brake control unit 2 that can control a brake hydraulic pressure of each wheel according to each traveling state. The brake control unit 2 includes a brake controller (hereinafter, referred to as also a brake control unit) 2a configured to control the braking torque generated by the brake 20. The brake control unit 2 includes a brake controller 2a configured to control the braking torque generated by the brake 20, and uses a master cylinder pressure generated through a brake pedal operation by a vehicle driver or a pump pressure generated by a built-in motor driving pump as a hydraulic pressure source, to generate a desired hydraulic pressure at the brake 20 of each wheel through opening and closing operations by a plurality of electromagnetic valves.

S/A 3 is a damping force generation device configured to decrease an elastic motion of a coil spring provided between an unsprung portion (axles, wheels, or the like) and a sprung portion (a vehicle body or the like), of the vehicle, and is configured to vary a damping force in an adjustable manner by an operation of an actuator. S/A 3 includes a cylinder into which a fluid is enclosed, a piston which slides up and down inside the cylinder, and an orifice configured to control the fluid movement between fluid chambers formed above and below the piston. In addition, orifices having several types of orifice diameters are formed on the piston, and when the S/A actuator is being operated, an orifice in accordance with a control command is selected from the several types of orifices. This makes it possible to generate a damping force in accordance with the orifice diameter. For example, the movement of the piston is likely to be limited with the smaller orifice diameter to increase a damping force, whereas the movement of the piston is less likely to be limited with the larger orifice diameter to decrease a damping force.

Note that, in addition to the selection of the orifice, a damping force may be set, for example, such that an electromagnetic control valve is arranged on a communicating path which connects the fluid chambers formed above and below the piston, and the opening and closing amount of the electromagnetic control valve is controlled. The way to set a damping force is not especially limited. S/A 3 includes an S/A controller 3a (corresponding to a damping force control unit) configured to control a damping force of S/A 3, and controls the damping force to cause the S/A actuator to activate the orifice diameter.

Moreover, the vehicle includes wheel speed sensors 5 (hereinafter, when a wheel speed corresponding to an individual wheel is displayed, described as a right front-wheel speed: 5FR, a left front-wheel speed: 5FL, a right rear-wheel speed: 5RR, a left rear-wheel speed: and 5RL) each of configured to detect a wheel speed of each wheel, an integrated type sensor 6 configured to detect a longitudinal acceleration acting on the gravity center of the vehicle, a yaw rate, and a lateral acceleration, a steering angle sensor 7 configured to detect an operating steering angle serving as a steering operation amount by the vehicle driver, a vehicle speed sensor 8 configured to detect a vehicle speed, an engine torque sensor 9 configured to detect engine torque, an engine speed sensor 10 configured to detect an engine speed, a master pressure sensor 11 configured to detect a master cylinder pressure, a brake switch 12 configured to output an on-state signal when a brake pedal operation is performed, and an accelerator opening degree sensor 13 configured to detect an accelerator pedal opening degree. The signals from these various kinds of sensors are inputted into the S/A controllers 3a. Note that, the integrated type sensor 6 may be arranged at a position of the center of gravity of the vehicle, or may be arranged at another position as long as the configuration of various kinds of values at the position of the center of gravity can be estimated. The arrangement of the integrated type sensor 6 is not especially limited. Moreover, the sensor 6 is not necessarily to an integrated type, and may be configured to detect a yaw rate, a longitudinal acceleration, and a lateral acceleration separately.

Figure 2:
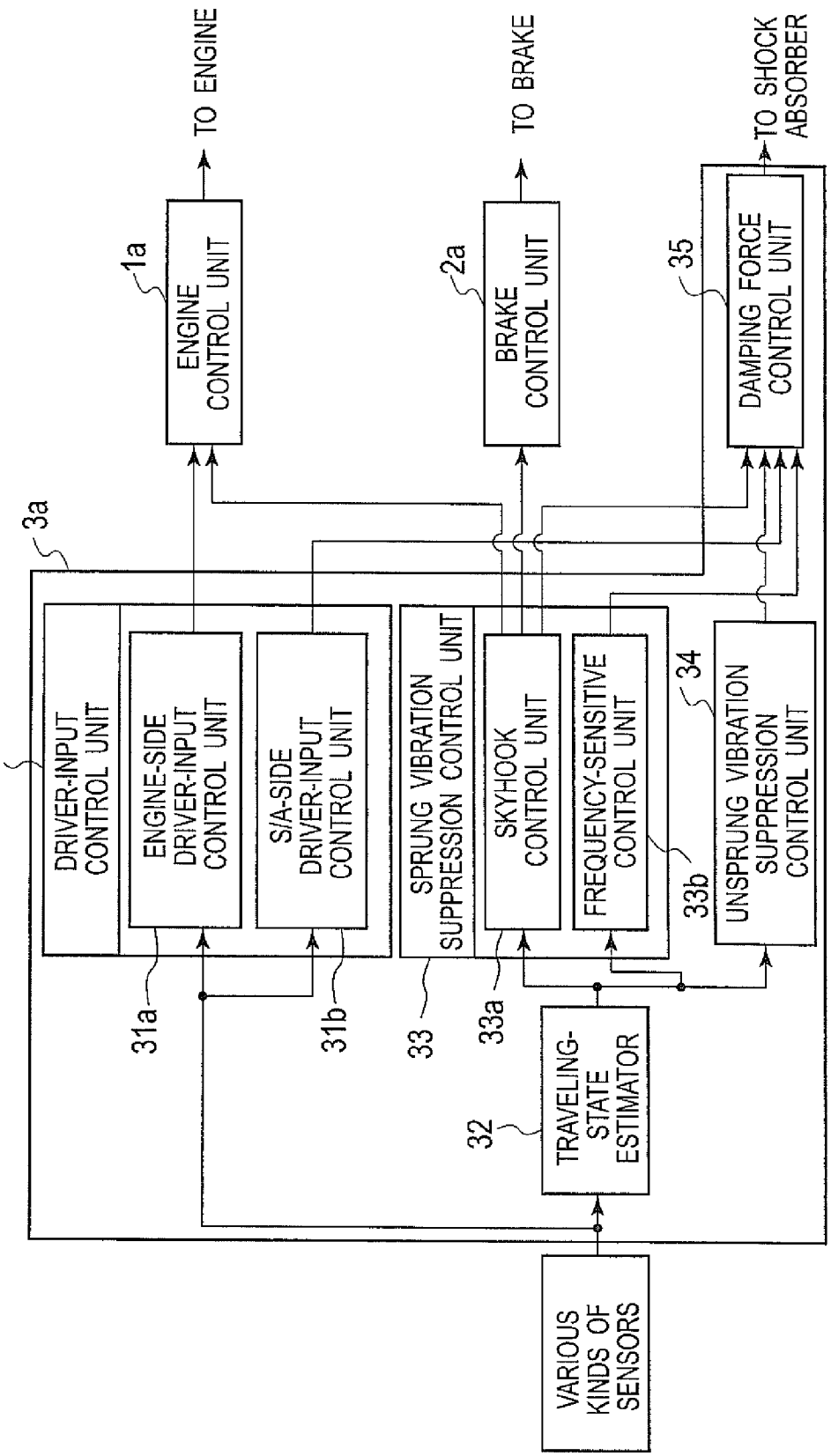
FIG. 2 is a control block diagram illustrating a control configuration of the control apparatus for a vehicle according to the first embodiment.

FIG. 2 is a control block diagram illustrating a control configuration of the control apparatus for a vehicle according to the first embodiment. In the first embodiment, a controller includes three controllers of the engine controller 1a, a brake controller 2a, and the S/A controller 3a.

The S/A controller 3a includes a driver-input control unit 31 configured to perform driver-input control for attaining a desired vehicle attitude based on operations (steering operation, accelerator operation and brake pedal operation or the like) by the vehicle driver, a traveling-state estimator 32 configured to estimate a traveling state based on the detection values by the various kinds of sensors, a sprung vibration suppression control unit 33 configured to control a sprung vibration state based on the estimated traveling state, an unsprung vibration suppression control unit 34 configured to control an unsprung vibration state based on the estimated traveling state, and a damping force control unit 35 configured to determine, based on the shock absorber attitude control amount outputted from the driver-input control unit 31, the sprung vibration suppression control amount outputted from the sprung vibration suppression control unit 33, and the unsprung vibration suppression control amount outputted from the unsprung vibration suppression control unit 34, a damping force to be set to S/A 3, and controls the damping force of S/A.

In the first embodiment, there is shown a controller including three controllers. However, for example, the controller may include four controllers by excluding the damping force control unit 35 from the S/A controller 3a and using the resulting S/A controller 3a as an attitude controller and using the damping force control unit 35 as the S/A controller, or all the respective controllers may constitute one integral controller. The configuration of the controllers is not particularly limited. Note that the reason why such a configuration is employed in the first embodiment is because it is assumed that the control apparatus for a vehicle in the first embodiment is implemented by using an engine controller and a brake controller in an existing vehicle without any change as the engine controller 1a and the brake controller 2a, and separately mounting the S/A controller 3a.

The control apparatus for a vehicle in the first embodiment uses three actuators for controlling a vibration state generated on the sprung portion. In this process, the sprung state is controlled by the respective actuators, thereby causing a problem of mutual interference. Moreover, control elements which can be controlled by the engine 1, the brake 20, and S/A 3 are different from one another, thereby causing a problem that how to combine these control elements for performing the control.

For example, although the brake 20 can control the bounce movement and the pitch movement, the control of both the movements causes the strong sense of deceleration, thereby easily giving a discomfort feeling to a vehicle driver. Moreover, S/A 3 can control all of the roll movement, the bounce movement, and the pitch movement. However, because performing all the control by S/A 3 results in increasing the manufacturing cost for S/A 3, and a tendency of an increased damping force, high frequency vibration from the road surface side is likely to be inputted, thereby also easily giving a discomfort feeling to the vehicle driver. In other words, there is a trade-off that the control by the brake 20 does not cause the high frequency vibration to be worse but cause the sense of deceleration to be increased, whereas the control by S/A 3 does not cause the sense of deceleration but cause the high frequency vibration to be inputted.

Therefore, as for the control apparatus for a vehicle in the first embodiment, by comprehensively judging these problems, in order that a control apparatus for a vehicle at a low cost but excellent in vibration damping ability is implemented by achieving a control configuration in which the mutual weak points are complemented to one another while the advantage points as the respective control characteristics are made to use, the overall control system thereof is constructed by considering the points listed below.

(1) The control by the engine 1 and the control by the brake 20 are performed with priority to suppress the control amount by S/A 3.

(2) The control object movement of the brake 20 is limited to the pitch movement to resolve the sense of deceleration due to the control by the brake 20.

(3) The control amounts by the engine 1 and the brake 20 are limited than the control amount which can be actually outputted, thereby suppressing a discomfort feeling generated with the control by the engine 1 or the brake 20 while reducing burden on S/A 3.

(4) All the actuators perform skyhook control. At this time, the skyhook control is achieved with an inexpensive configuration using a wheel speed sensor currently mounted in all the vehicles, without using a stroke sensor, a sprung vertical acceleration sensor, or the like usually required for the skyhook control.

(5) When the sprung control by the S/A 3 is performed, scalar control (frequency-sensitive control) is newly introduced with respect to an input of high frequency vibration to which vector control such as skyhook control is difficult to correspond.

(6) Selecting a control state implemented by the S/A 3 as appropriate according to a traveling state provides a suitable control state in accordance with a traveling status.

The overview of the overall control system configured in the embodiment is described above. Hereinafter, specific contents which implement the control system will be successively explained.

First, the driver-input control unit is described. The driver-input control unit 31 includes: an engine-side driver-input control unit 31a configured to attain a vehicle attitude, which a vehicle driver requests, by torque control of the engine 1; and an S/A-side driver-input control unit 31b configured to attain a vehicle attitude, which a vehicle driver requests, by damping force control of S/A 3. The engine-side driver-input control unit 31a calculates a grounding-load fluctuation suppression control amount for suppressing grounding-load fluctuations between front-wheels and rear-wheels, and a yaw response control amount corresponding to a vehicle behavior that the vehicle driver intends to attain based on a signal from the steering angle sensor 7 or the vehicle speed sensor 8(a) and outputs the same to the engine control unit 1a.

The S/A-side driver-input control unit 31b calculates a driver input damping force control amount corresponding to a vehicle behavior that the vehicle driver intends to attain based on a signal from the steering angle sensor 7 or the vehicle speed sensor 8(a) and outputs the driver input damping force control amount to the damping force control unit 35. For example, while the vehicle driver is turning a vehicle, if the nose side of the vehicle is lifted, the field of vision of the vehicle driver is likely to be out of the road surface. Accordingly, in this case, the S/A-side driver-input control unit 31b outputs the damping force of four wheels as a driver input damping force control amount to prevent the nose from being lifted. Moreover, the S/A-side driver-input control unit 31b outputs a driver input damping force control amount for suppressing the roll generated during the turning.

Figure 3:
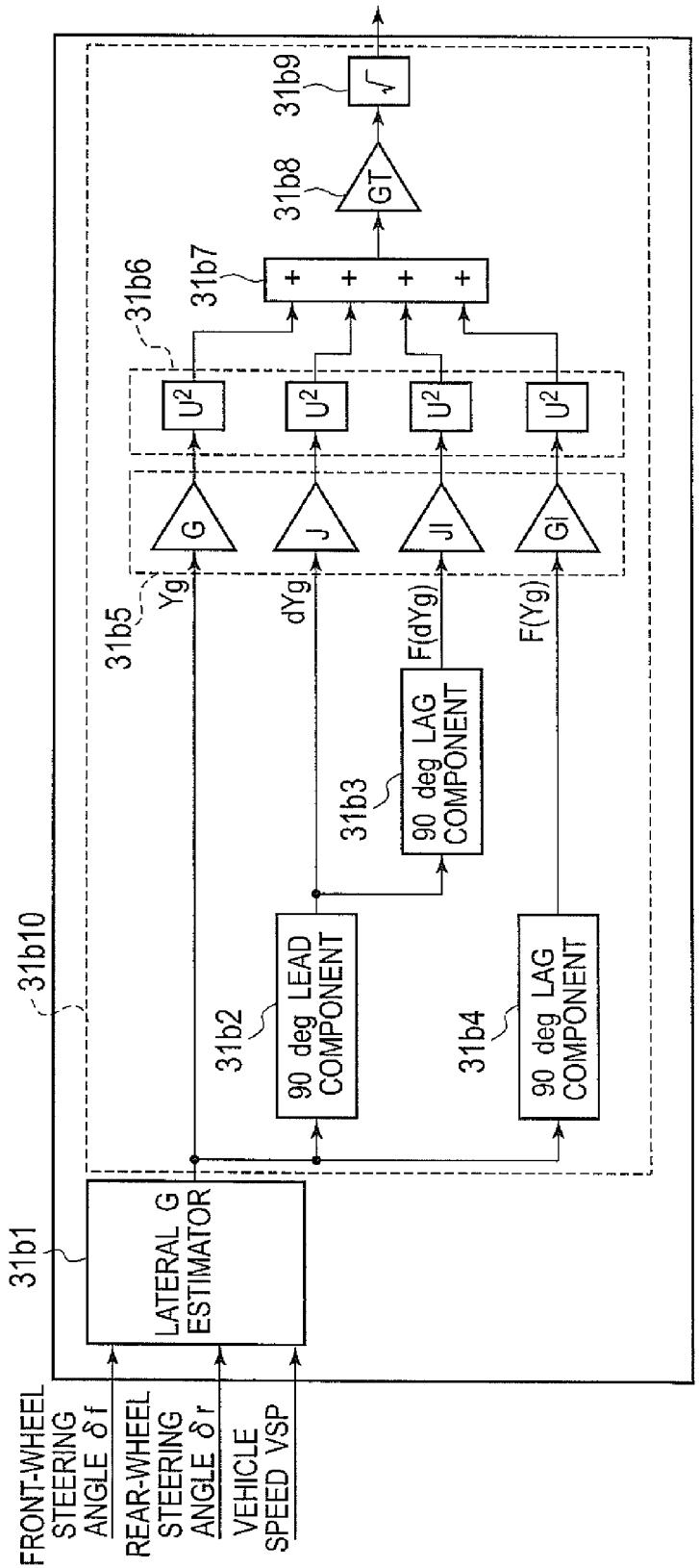
FIG. 3 is a control block diagram illustrating a configuration of roll rate suppression control according to the first embodiment.

Here, roll suppression control performed in the S/A-side driver-input control is explained. FIG. 3 is a control block diagram illustrating a control configuration of roll rate suppression control in the first embodiment. A lateral acceleration estimator 31b1 estimates a lateral acceleration Yg based on a front-wheel steering angle $\delta f$ detected by the steering angle sensor 7, a rear-wheel steering angle $\delta r$ (that may be an actual rear wheel steering angle when provided with a rear-wheel steering device, otherwise zero as required), and a vehicle speed VSP detected by the vehicle speed sensor 8. This lateral acceleration Yg is calculated by the following equation using an estimated yaw rate value $\gamma$.

$Yg = VSP \cdot \gamma$

Note that the estimated Yaw rate value $\gamma$ is calculated by the following equations.

$$\begin{Bmatrix} \beta \\ \gamma \end{Bmatrix} = N \begin{Bmatrix} \delta_f \\ \delta_r \end{Bmatrix}$$

$$\begin{Bmatrix} \beta \\ \gamma \end{Bmatrix} = M^{-1} N \begin{Bmatrix} \delta_f \\ \delta_f \end{Bmatrix}$$

Where $$M = \begin{bmatrix} m_{11} & m_{12} \\ m_{21} & m_{22} \end{bmatrix},$$

$$N = \begin{bmatrix} n_{11} & n_{12} \\ n_{21} & n_{22} \end{bmatrix}$$

$m_{11} = -(Ktf \cdot Lf - Ktv \cdot Lv)$ $m_{12} = -\frac{1}{V}(Ktf \cdot Lf^2 - Ktv \cdot Lv^2)$ $m_{21} = -2(Ktf + Ktv)$ $m_{22} = -\frac{2}{V}(Ktf \cdot Lf - Ktv \cdot Lv) - M \cdot V$ $n_{11} = -Ktf \cdot Lf$ $n_{12} = Ktv \cdot Lr$ $n_{21} = -2 \cdot Ktf$ $n_{22} = -2 \cdot Ktv$ vehicle body slip angle $\beta$
vehicle body yaw rate $\gamma$
front wheel steering angle $\delta f$ rear wheel steering angle δr
vehicle body V
front wheel CP Ktf
rear wheel CP Ktr
distance from front shaft to center of gravity Lf
distance from rear shaft to center of gravity Lr
vehicle body mass M A 90° phase lead component generation unit 31b2 differentiates an estimated lateral acceleration Yg and outputs the result as a lateral acceleration differential value dYg. A 90° phase lag component generation unit 31b3 outputs a component F(dYg), which is obtained by delaying the phase of the lateral acceleration differential value dYg by 90°. The component F(dYg) is a component obtained by bringing back the phase of the lateral acceleration differential value dYg, whose component in a low frequency region is removed by the 90° phase lead component generation unit 31b2, to the phase of the lateral acceleration Yg, and is a DC-cut component of the lateral acceleration Yg, i.e., a transitional component of the lateral acceleration Yg. A 90° phase lag component generation unit 31b4 outputs a component F(Yg), which is obtained by delaying the phase of the estimated lateral acceleration Yg by 90°. A gain multiplication unit 31b5 multiplies the lateral acceleration Yg, the lateral acceleration differential value dYg, the lateral acceleration DC cut component F (dYg), and the 90° phase lag component F (Yg) by a gain, respectively. Each gain is set based on a roll rate transfer function of an operating steering angle. Moreover, each gain may be adjusted in accordance with four control modes described later. A square calculation unit 31b6 squares each component multiplied by a gain and outputs this result. A summation unit 31b7 sums up the values which the square calculation unit 31b6 outputted. A gain multiplication unit 31b8 multiplies a square value of the summed up components by a gain and outputs this result. A square root calculation unit 31b9 calculates a driver input attitude control amount for roll rate suppression control by calculating a square root of the value which the gain multiplication unit 31b7 outputted, and outputs this result to the damping force control unit 35.

The 90° phase lead component generation unit 31b2, the 90° phase lag component generation unit 31b3, the 90° phase lag component generation unit 31b4, the gain multiplication unit 31b5, the square calculation unit 31b6, the summation unit 31b7, the gain multiplication unit 31b8(a)nd the square root calculation unit 31b9 correspond to a Hilbert conversion unit 31b10 that generates an envelopment waveform using Hilbert conversion.

Figure 4:
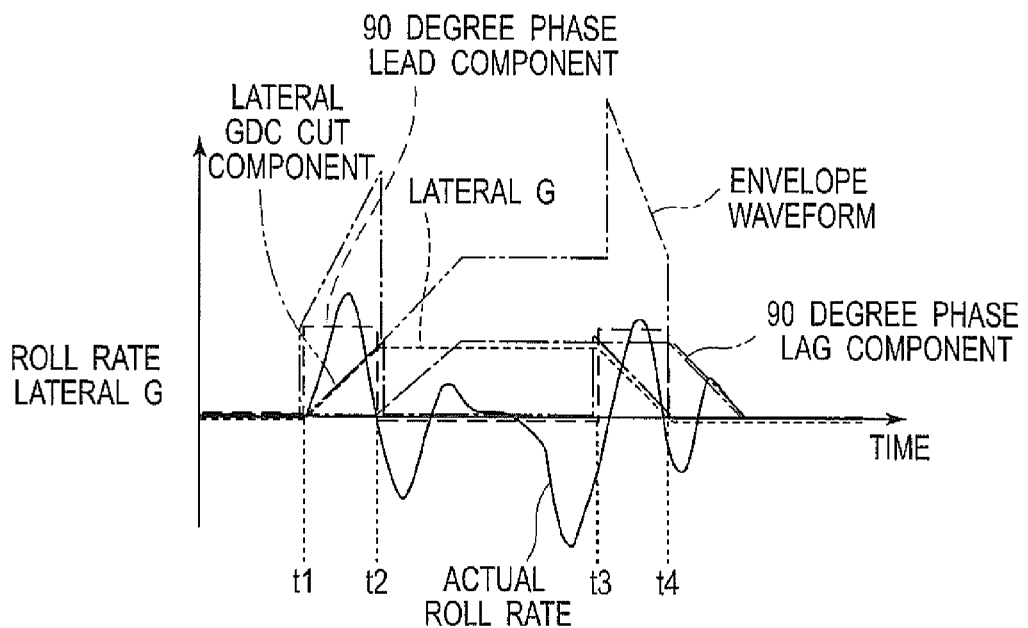
FIG. 4 is a time chart illustrating envelope waveform forming processing in the roll rate suppression control according to the first embodiment.

FIG. 4 is a time chart illustrating envelope waveform forming processing in the roll rate suppression control in the first embodiment. When a vehicle driver starts steering at time t1, the roll rate gradually starts to be generated. In this process, a 90° phase lead component is added to form an envelope waveform, and a driver input attitude control amount is calculated on the basis of the scalar quantity based on the envelope waveform, thereby making it possible to suppress the roll rate from generating at the initial steering. Furthermore, the lateral acceleration DC cut component F(dYg) is added to form an envelopment waveform, thereby enabling to efficiently suppress a roll rate that occurs in a transient condition when a vehicle driver starts or completes steering. In other words, in a stationary turning state in which the generation of a roll is stable, degradation of the ride comfort can be prevented without excessively increasing the damping force.

Next, at time t2, once the vehicle driver becomes in a steady steering state, neither 90° phase lead component dYg nor the lateral acceleration DC cut component F(dYg) is present, and the phase lag component F(Yg) is added at this time. At this time, even if the roll rate itself does not vary so much in the steady turning state, the roll rate resonance component corresponding to the repeat of rolling is generated after being rolled. If no phase lag component F(Yg) is added, a small value will be set as the damping force from at time t2 to at time t3. This might cause instability of the vehicle behavior due to the roll rate resonance component. In order to suppress this roll rate resonance component, the 90° phase lag component F(Yg) is applied.

At time t3, when the state of the vehicle driver is moved from a steering-retaining state to a straight ahead traveling state, the lateral acceleration Yg becomes smaller and the roll rate is also converged to a smaller value. Also here, the effect of the 90° phase lag component F(Yg) steadily secures the damping force, thereby making it possible to prevent the instability due to the roll rate resonance component.

Figure 5:
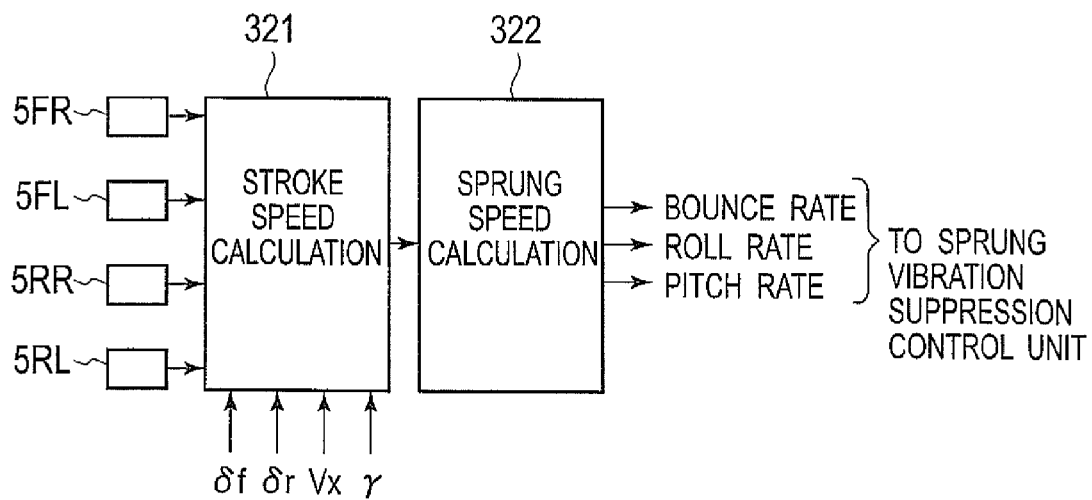
FIG. 5 is a control block diagram illustrating a configuration of a traveling state estimator according to the first embodiment.

Next, the traveling-state estimator is described. FIG. 5 is a control block diagram illustrating the configuration of the traveling state estimator according to the first embodiment. The traveling state estimator 32 according to the first embodiment, basically based on the wheel speed detected by the wheel speed sensor 5, calculates a stroke speed, a bounce rate, a roll rate, and a pitch rate of each wheel used for the skyhook control by the sprung vibration suppression control unit 33 described later. First, the value of the wheel speed sensor 5 of each wheel is inputted to a stroke speed calculation unit 321, and a sprung speed is calculated from the stroke speed of each wheel calculated by the stroke speed calculation unit 321.

Figure 6:
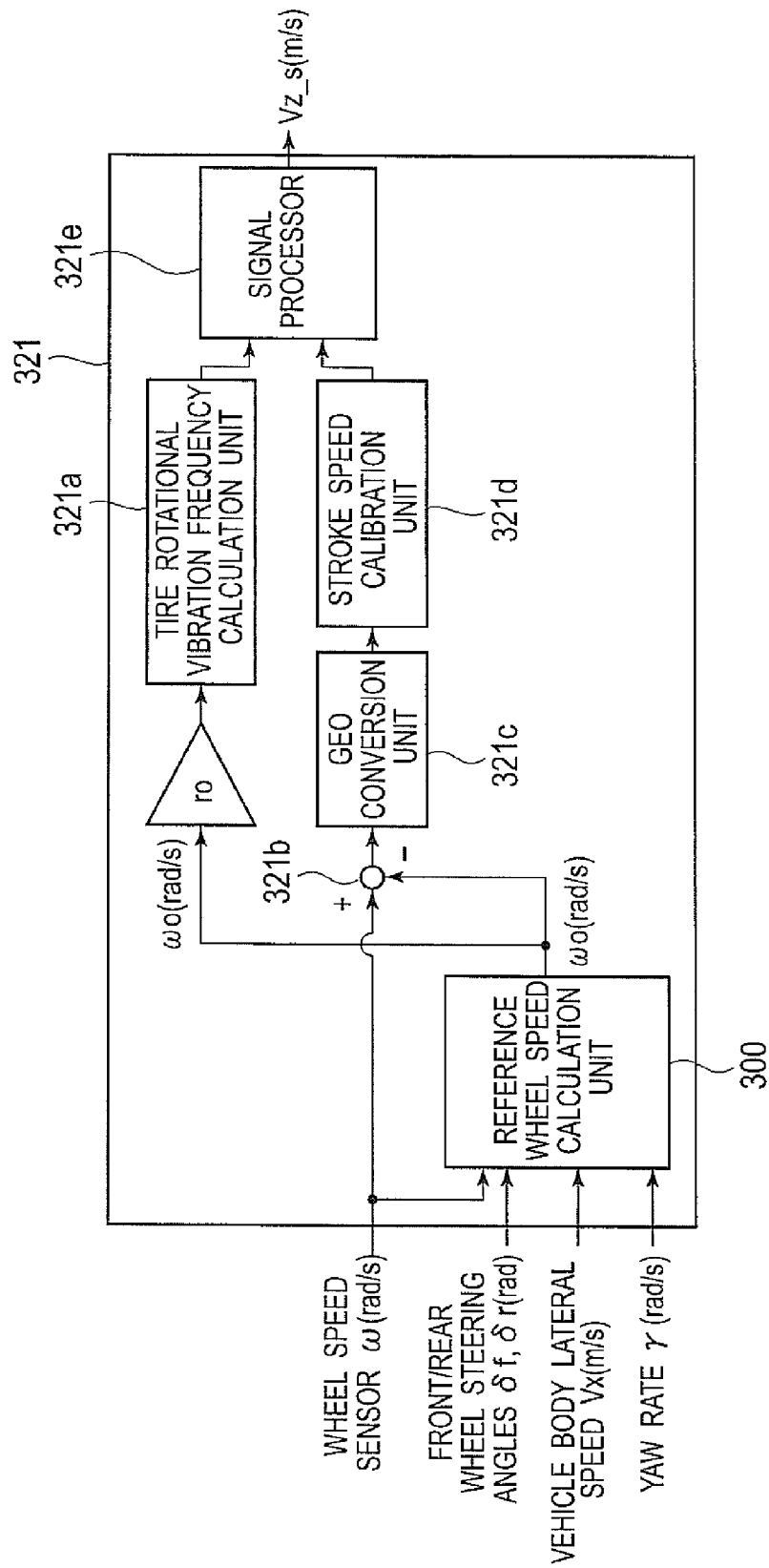
FIG. 6 is a control block diagram illustrating control contents in a stroke speed calculation unit according to the first embodiment.

FIG. 6 is a control block diagram illustrating control contents in the stroke speed calculation unit according to the first embodiment. The stroke speed calculation unit 321 is separately provided for each wheel, and the control block diagram illustrated in FIG. 6 is a control block diagram focused on a certain wheel.

The stroke speed calculation unit 321 includes: a reference wheel speed calculation unit 300 configured to calculate the wheel speed serving as the reference, based on the value of the wheel speed sensor 5, the front wheel steering angle δf and the rear wheel steering angle δr (which may be an actual rear wheel steering angle when provided with a rear-wheel steering device, otherwise zero as required) detected by the steering angle sensor 7, the vehicle body lateral speed, and the actual yaw rate detected by the integrated type sensor 6; a tire rotational vibration frequency calculation unit 321a configured to calculate a tire rotational vibration frequency based on the calculated reference wheel speed; a deviation calculation unit 321b configured to calculate a deviation (wheel speed fluctuation) between the reference wheel speed and the wheel speed sensor value; a GEO conversion unit 321c configured to convert the deviation calculated by the deviation calculation unit 321b to a suspension stroke quantity; a stroke speed calibration unit 321d configured to calibrate the converted stroke quantity to a stroke speed; and a signal processor 321e that removes a tire rotation primary vibration component by applying a band elimination filter corresponding to a frequency calculated by the tire rotational vibration frequency calculation unit 321a to a value calibrated by the stroke speed calibration unit 321d, and calculates a final stroke speed.

Figure 7:
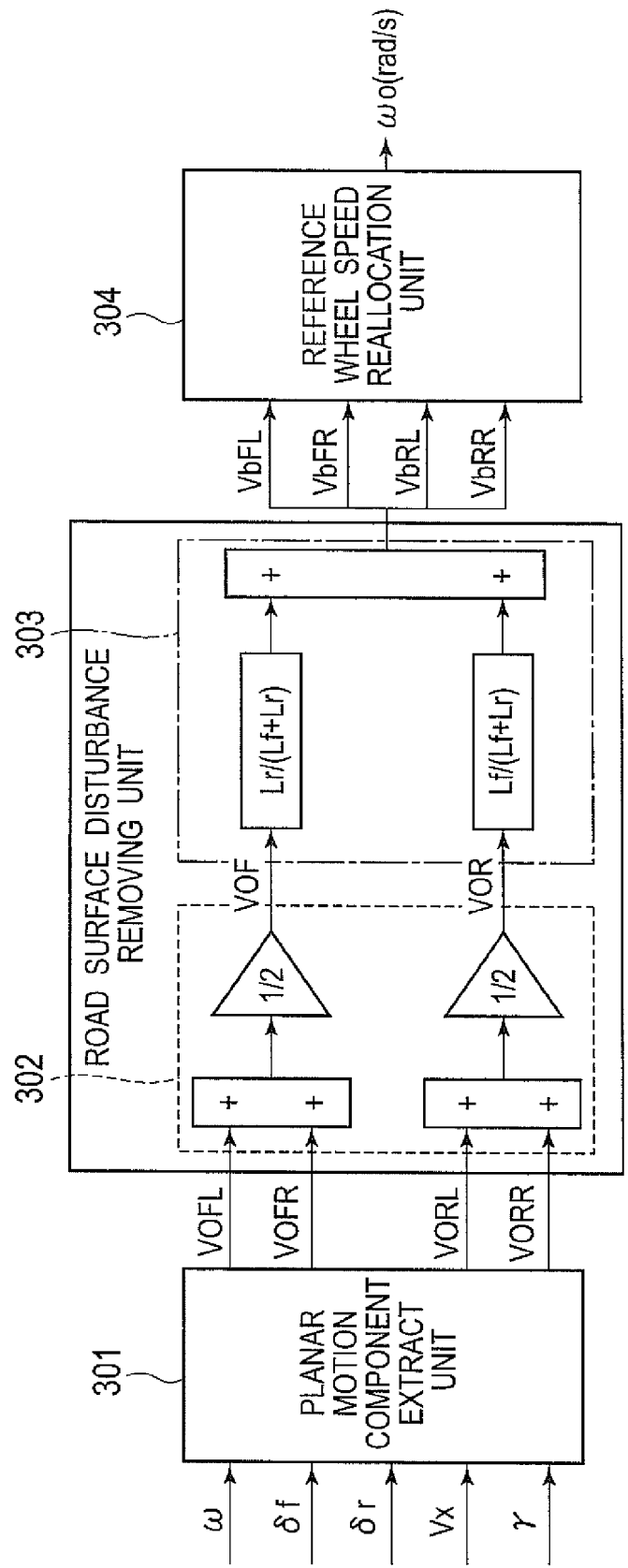
FIG. 7 is a block diagram illustrating a configuration of a reference wheel speed calculation unit according to the first embodiment.

Here, the reference wheel speed calculation unit 300 is described. FIG. 7 is a block diagram illustrating the configuration of the reference wheel speed calculation unit according to the first embodiment. The reference wheel speed refers to the value of each wheel speed after removing various kinds of disturbances. In other words, a difference between the wheel speed sensor value and the reference wheel speed is a value related to a component that fluctuates in response to a stroke generated by the bounce behavior, the roll behavior, the pitch behavior of a vehicle body or by the unsprung vertical vibration. In the embodiment, the stroke speed is estimated based on this difference.

A planar motion component extract unit 301 calculates a first wheel speed V0 serving as the reference wheel speed of each wheel, based on a vehicle body plan view model with the wheel speed sensor value as an input. Here, the wheel speed sensor value detected by the wheel speed sensor 5 is denoted as ω(rad/s), the front wheel actual steering angle detected by the steering angle sensor 7 as δf(rad), the rear wheel actual steering angle as δr(rad), the vehicle body lateral speed as Vx, the yaw rate detected by the integrated type sensor 6 as γ(rad/s), the vehicle body speed estimated from the calculated reference wheel speed ω0 as V (m/s), the reference wheel speeds to be calculated as VFL, VFR, VRL, and VRR, a tread of the front wheel as Tf, a tread of the rear wheel as Tr, a distance from the center of gravity position of the vehicle to the front wheel as Lf, and a distance from the center of gravity position of the vehicle to the front wheel as Lr. Using the above reference symbols, the vehicle body plan view model is expressed as follows.

$$VFL=(V-Tf/2\cdot\gamma)\cos \delta f+(Vx+Lf\cdot\gamma)\sin \delta f$$

$$VFR=(V+Tf/2\cdot\gamma)\cos \delta f+(Vx+Lf\cdot\gamma)\sin \delta f$$

$$VRL=(V-Tr/2\cdot\gamma)\cos \delta r+(Vx-Lr\cdot\gamma)\sin \delta r$$

$$VRR=(V+Tr/2\cdot\gamma)\cos \delta r+(Vx-Lr\cdot\gamma)\sin \delta r$$

Note that, assuming the normal travelling time during which sideslip is not occurring in the vehicle, then zero may be input to the vehicle body lateral speed Vx. By transforming the respective equations into V-based values, the equations are expressed as follows. In this transformation, V is denoted as V0FL, V0FR, V0RL, and V0RR (corresponding to the first wheel speeds), as the values corresponding to the respective wheels.

$$V0FL=\{VFL-Lf\cdot\gamma \sin \delta f\}/\cos \delta f+Tf/2\cdot\gamma$$

$$V0FR=\{VFR-Lf\cdot\gamma \sin \delta f\}/\cos \delta f-Tf/2\cdot\gamma$$

$$V0RL=\{VRL+Lr\cdot\gamma \sin \delta r\}/\cos \delta r+Tr/2\cdot\gamma$$

$$V0RR=\{VRR+Lf\cdot\gamma \sin \delta f\}/\cos \delta r-Tr/2\cdot\gamma$$

A roll disturbance removing unit 302 calculates, based on a vehicle body front view model, second wheel speeds V0F and V0R serving as the reference wheel speeds of the front and rear wheels, with the first wheel speed V0 as an input. The vehicle body front view model is for removing a difference between wheel speeds that is caused by a roll movement occurring around the center of roll rotation on a vertical line passing the center of gravity of the vehicle when the vehicle is seen from the front. This is expressed with the equation below.

$$V0F=(V0FL+V0FR)/2$$

$$V0R=(V0RL+V0RR)/2$$

Thus, the second wheel speeds V0F and V0R after removing the disturbance caused by the roll are obtained.

A pitch disturbance removing unit 303 calculates, based on a vehicle body side view model, third wheel speeds VbFL, VbFR, VbRL, and VbRR serving as the reference wheel speeds for all the wheels, with the second wheel speeds V0F and V0R as inputs. Here, the vehicle body side view model is for removing an error that is caused by a pitch movement occurring around the center of pitch rotation on the vertical line passing the center of gravity of the vehicle when the vehicle is seen from a lateral direction. This is expressed with the equation below.

$$VbFL=VbFR=VbRL=VbRR=\{Lr/(Lf+Lr)\}V0F+\{Lf/(Lf+Lr)\}V0R$$

A reference wheel speed reallocation unit 304 substitutes VbFL (=VbFR=VbRL=VbRR) into V of the vehicle body plan view model, respectively, calculates the final reference wheel speeds VFL, VFR, VRL and VRR of the respective wheels, and calculates the reference wheel speed ω0 by dividing the final reference wheel speeds by a tire radius r0, respectively.

Upon calculation of the reference wheel speed ω0 of each wheel by the above-described processing, a deviation between this reference wheel speed ω0 and the wheel speed sensor value is calculated, and is converted to a stroke speed Vz_s because this deviation is a wheel speed fluctuation associated with the stroke of a suspension. Basically, the suspension, in holding each wheel, will not stroke only in a vertical direction, but the wheel rotation center moves longitudinally along with the stroke and at the same time an axle itself having the wheel speed sensor 5 mounted thereon has a gradient and generates a rotational angle difference with respect to a wheel. Because the wheel speed varies with this longitudinal movement, the deviation between the reference wheel speed and the wheel speed sensor value can be extracted as a fluctuation associated with this stroke. Note that how much fluctuation is generated may be appropriately set in accordance with the geometry of the suspension.

Upon calculation of the stroke speeds Vz_sFL, Vz_sFR, Vz_sRL, and Vz_sRR in the respective wheels through the above-described processing by the stroke speed calculation unit 321, the sprung speed calculation unit 322 calculates a bounce rate, a roll rate, and a pitch rate for skyhook control.

The skyhook control sets a damping force based on the relation between the stroke speed and the sprung speed of S/A 3 to perform sprung attitude control, thereby attaining a flat traveling state. Here, in order to attain the sprung attitude control by the skyhook control, it is required to feedback the sprung speed. Now that the value detectable from the wheel speed sensor 5 is the stroke speed and the sprung portion does not include a vertical acceleration sensor or the like, the sprung speed needs to be estimated using an estimation model. Hereinafter, a problem of the estimation model and the model configuration to be employed is explained.

Figure 8A:
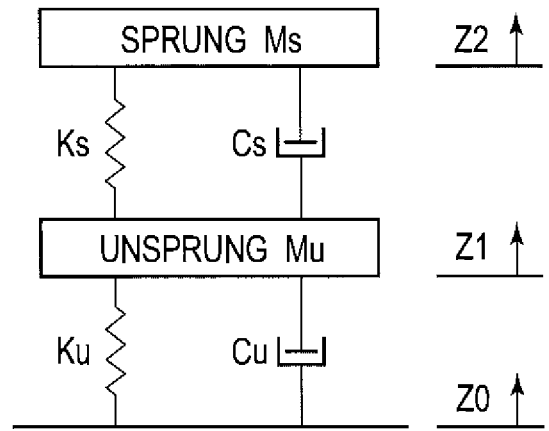
FIGS. 8A and 8B are schematic views each illustrating a vehicle body vibration model.
Figure 8B:
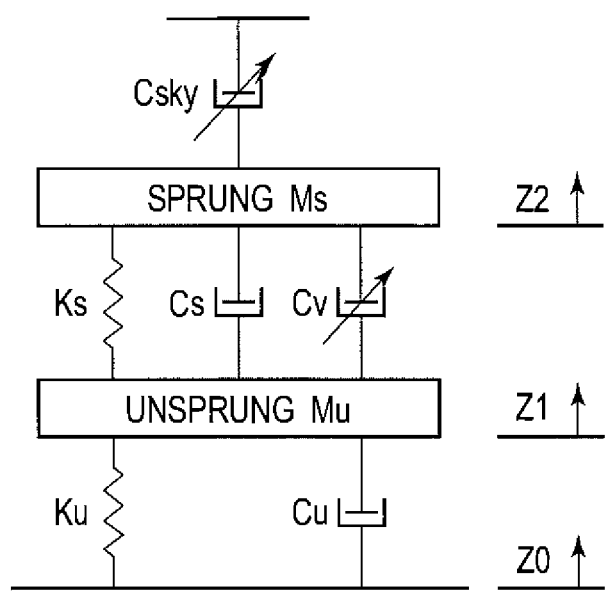

FIGS. 8(a) and 8(b) are schematic views illustrating a vehicle body vibration model. FIG. 8(a) illustrates a model of the vehicle which is provided with S/A of a constant damping force (hereinafter, described as conventional vehicle), and FIG. 8(b) shows a model of the vehicle which is provided with S/A of a variable damping force and performs skyhook control. In FIGS. 8(a) and 8(b), Ms represents a sprung mass, Mu represents an unsprung mass, Ks represents an elastic coefficient of a coil spring, Cs represents a damping coefficient of S/A, Ku represents an elastic coefficient of an unsprung portion (tire), Cu represents a damping coefficient of the unsprung portion (tire), and Cv represents a variable damping coefficient. Moreover, z2 represents a sprung position, z1 represents an unsprung position, and z0 represents a road surface position.

When the conventional vehicle model shown in FIG. 8(a) is used, the equation of motion with respect to the sprung portion is represented as follows. Note that, dz1 represents first order differentiation of z1 (that is speed), and ddz1 represents second order differentiation thereof (that is acceleration).

$$Ms\cdot ddz2=-Ks(z2-z1)-Cs(dz2-dz1)$$

The relational expression which is subjected to Laplace transform and simplified is expressed as follows.

$$dz2=-(1/Ms)\cdot(1/s2)\cdot(Cs\cdot s+Ks)(dz2-dz1)$$

Here, because dz2−dz1 is the stroke speed (Vz_sFL, Vz_sFR, Vz_sRL, and Vz_sRR), a sprung speed can be calculated from the stroke speed. However, change of a damping force by the skyhook control remarkably lowers the estimation accuracy. This raises a problem that a large attitude control force (damping force change) cannot be applied by the conventional vehicle model.

Therefore, it can be considered that the vehicle model by the skyhook control such as that shown in FIG. 8(*b*) is used. Change of a damping force basically means to change a force of limiting the piston traveling speed of S/A 3 with the suspension stroke. Because the semi-active S/A 3 which cannot actively move the piston toward a desired direction is used, a semi-active skyhook model is employed to obtain a sprung speed. An equation is expressed as follows.

$$dz2=-(1/Ms)\cdot(1/s2)\cdot\{(Cs+Cv)\cdot s+Ks\}(dz2-dz1)$$

If $$dz2\cdot(dz2-dz1)\geq 0$$

then $$Cv=Csky\cdot\{dz2/(dz2-dz1)\}$$

and if $$dz2\cdot(dz2-dz1)<0$$

then $$Cv=0$$

That is, Cv becomes a discontinuous value.

Now, when considering that estimation of the sprung speed using a simple filter is intended, with the semi-active skyhook model, the suitable estimation accuracy cannot be obtained because if this model is seen as a filter, each variable corresponds to a filter coefficient, the pseudo differential term {(Cs+Cv)·s+Ks} contains the discontinuous variable damping coefficient Cv, whereby causing an unstable filter response. In particular, the unstable filter response causes a shift phase. The loss of the correspondence relation between the phase and the code of the sprung speed does not allow the skyhook control to be attained. Therefore, even if the semi-active S/A 3 is used, it is decided that a sprung speed is estimated using an active skyhook model which does not depend on the code relation between the sprung speed and the stroke speed, and is possible to directly use Csky with stability. The active skyhook model is employed to obtain a sprung speed. An equation is expressed as follows.

$$dz2=-(1/s)\cdot\{1/(s+Csky/Ms)\}\cdot\{(Cs/Ms)s+(Ks/Ms)\}(dz2-dz1)$$

In this case, no discontinuity arises in the pseudo differential term {(Cs/Ms)s+(Ks/Ms)}, and the term of {1/(s+Csky/Ms)} can be configured by a low-pass filter. Accordingly, a filter response becomes stable, which makes it possible to obtain a suitable estimation accuracy. Note that, here, even employing the active skyhook model, because only the semi-active control is actually possible, a controllable region becomes half. Accordingly, the magnitude of the sprung speed to be estimated is smaller than the actual speed in the frequency band equal to or less than the sprung resonance. However, this does not cause a problem because the phase is most important in the skyhook control, the skyhook control is attained as long as the correspondence relation between the phase and the code can be maintained, and the magnitude of the sprung speed is adjustable with other coefficients or the like.

It can be understood that obtaining the stroke speed of each wheel with the above relations allows the sprung speed to be estimated. Next, because the vehicle is actually not one-wheeled but four-wheeled, it is examined that a sprung state is estimated using the stroke speed of each wheel by modal decomposition to components of the roll rate, the pitch rate, and the bounce rate. Now, when the abovementioned three components are calculated from the stroke speeds of the four wheels, one component corresponding thereto is lacking to cause a solution to be indefinite. Accordingly, it is decided that a wrap rate showing motion of diagonal wheels is introduced. When the bounce term of the stroke amount is xsB, the roll term thereof is xsR, the pitch term thereof is xsP, the wrap term thereof is xsW, and stroke amounts corresponding to Vz_sFL, Vz_sFR, Vz_sRL, and Vz_sRR are respectively z_sFL, z_sFR, z_sRL, and z_sRR, the following equation is established.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \begin{Bmatrix} xsB \\ xsR \\ xsP \\ xsW \end{Bmatrix} \rightarrow \begin{Bmatrix} xsB \\ xsR \\ xsP \\ xsW \end{Bmatrix}$$

$$= \begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{Bmatrix} z\_sFL \\ z\_sFR \\ z\_sRL \\ z\_sRR \end{Bmatrix}$$

From the relational expression described above, differentiation dxsB and so on of xsB, xsR, xsP, and xsW are expressed by the following equations.

$$dxsB=\tfrac{1}{4}(Vz\_sFL+Vz\_sFR+Vz\_sRL+Vz\_sRR)$$

$$dxsR=\tfrac{1}{4}(Vz\_sFL-Vz\_sFR+Vz\_sRL-Vz\_sRR)$$

$$dxsP=\tfrac{1}{4}(-Vz\_sFL-Vz\_sFR+Vz\_sRL+Vz\_sRR)$$

$$dxsW=\tfrac{1}{4}(-Vz\_sFL+Vz\_sFR+Vz\_sRL-Vz\_sRR)$$

Here, the relation between the sprung speed and the stroke speed is obtained from Estimate Equation 4 described above. Accordingly, in Estimate Equation 4, if the portion of −(1/s)·{1/(s+Csky/Ms)}·{(Cs/Ms)s+(Ks/Ms)} is denoted as G, and the values taking into consideration the respective modal parameters (CskyB, CskyR, CskyP, CsB, CsR, CsP, KsB, KsR, KsP) in accordance with the bounce terms, the roll terms, and the pitch terms of Csky, Cs, and Ks are denoted as GB, GR, and GP, and each bounce rate is denoted as dB, each roll rate as dR, and each pitch rate as dP, then dB, dR, and dP can be calculated as values below.

$$dB=GB\cdot dxsB$$

$$dR=GR\cdot dxsR$$

$$dP=GP\cdot dxsP$$

From the above, based on the stroke speed of each wheel, the state estimation of the sprung portion in the actual vehicle can be attained.

Next, a configuration of the sprung vibration suppression control unit 33 is described. As illustrated in FIG. 2, the sprung vibration suppression control unit 33 includes: the skyhook control unit 33a configured to perform the attitude control based on the above-described sprung speed estimate value; and the frequency-sensitive control unit 33b configured to suppress the sprung vibration based on a road surface input frequency.

The control apparatus for a vehicle according to the first embodiment includes three actuators for attaining the sprung attitude control as follows: an actuator for the engine 1; an actuator for the brake 20; and an actuator for S/A 3. Among them, in the skyhook control unit 33a, the bounce rate, the roll rate, and the pitch rate are set as three control objects for S/A 3, the bounce rate and pitch rate are set as the control objects for the engine 1, and the pitch rate is set as the control object for the brake 20. Here, in order to allocate control amounts to a plurality of actuators each having a different operation and control the sprung state, a control amount common to the respective actuators needs to be used. In the first embodiment, the control amount with respect to each actuator can be determined using the sprung speed estimated by the above-described traveling state estimator 32.

The skyhook control amount in a bounce direction is expressed as $$FB = CskyB \cdot dB$$

The skyhook control amount in a roll direction as $$FR = CskyR \cdot dR$$

The skyhook control amount in a pitch direction as $$FP = CskyP \cdot dP$$

FB is transmitted to the engine 1 and S/A 3 as the bounce attitude control amount, while FR is transmitted to the damping force control unit 35 as the roll attitude control amount because FR is controlled only in S/A 3.

Next, the skyhook control amount FP in the pitch direction is described. Usually, the pitch control is performed by the engine 1, the brake 20, and S/A 3. However, when S/A 3 does not operate, the control amounts of the engine 1 and the brake 20 are increased more than during normal time so as to perform the pitch control only by the engine 1 and the brake 20. Alternatively, when the variable range of the damping force becomes sufficiently narrow due to a failure of S/A 3, the pitch control is performed by the engine 1, the brake 20, and S/A 3. However, the control amounts of the engine 1 and the brake 20 are increased more than during normal time so as to reduce the control amount by S/A 3 less than during normal time.

Figure 9:
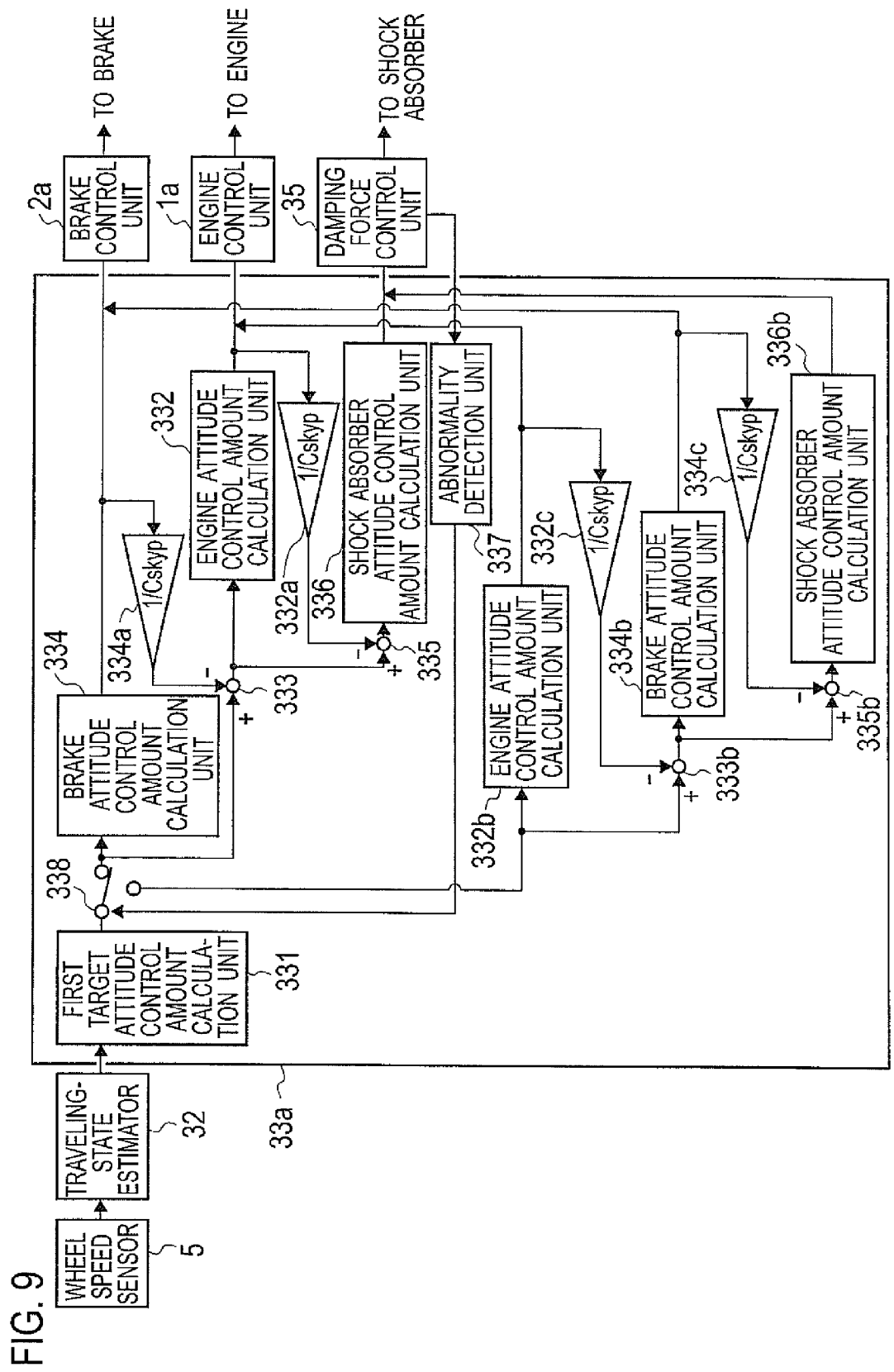
FIG. 9 is a control block diagram illustrating each actuator control amount calculation processing in performing pitch control according to the first embodiment.

FIG. 9 is a control block diagram illustrating each actuator control amount calculation processing in performing pitch control according to the first embodiment. In the first embodiment, the skyhook control unit 33a includes a first target attitude control amount calculation unit 331 configured to calculate a target pitch rate that is the first target attitude control amount that is the control amount available in common to all the actuators.

Moreover, the skyhook control unit 33a includes an abnormality detection unit 337 configured to detect an abnormality of S/A 3. When the abnormality detection unit 337 has not detected any abnormality of S/A 3, an engine attitude control amount calculation unit 332 configured to calculate the engine attitude control amount attained by the engine 1, a brake attitude control amount calculation unit 334 configured to calculate the brake attitude control amount attained by the brake 20, and an S/A attitude control amount calculation unit 336 configured to calculate the S/A attitude control amount attained by S/A 3 calculate the respective attitude control amounts.

On the other hand, when the abnormality detection unit 337 has detected an abnormality of S/A 3, an engine attitude control amount calculation unit 332b configured to calculate the engine attitude control amount attained by the engine 1, a brake attitude control amount calculation unit 334b configured to calculate the brake attitude control amount attained by the brake 20, and an S/A attitude control amount calculation unit 336b configured to calculate the S/A attitude control amount attained by S/A 3 calculate the respective attitude control amounts.

In the skyhook control of this system, because operation so as to suppress the pitch rate is the first priority, the first target attitude control amount calculation unit 331 outputs a pitch rate as it is (hereinafter, this pitch rate is referred to as a first target attitude control amount).

The damping force control unit 35 monitors S/A 3, and outputs a fail signal to the abnormality detection unit 337 when S/A 3 stops to operate due to a failure or when the variable range of the damping force becomes narrow (hereinafter, when S/A is abnormal). A switch 338 outputs the first target attitude control amount, which is calculated by the first target attitude control amount calculation unit 331, to the brake attitude control amount calculation unit 334 during normal time, while when the abnormality detection unit 337 detects the fail signal, the switch 338 outputs the same to the engine attitude control amount calculation unit 332b.

The brake attitude control amount calculation unit 334 calculates, based on an inputted first target attitude control amount, a brake attitude control amount that is the control amount that can be attained by the brake.

In the brake attitude control amount calculation unit 334, a limit value for limiting the brake attitude control amount is set so as not to give any sense of discomfort to the vehicle driver. This limits the brake attitude control amount so as to be within a predetermined range of longitudinal acceleration when converted to a longitudinal acceleration. Accordingly, the brake attitude control amount calculation unit 334 calculates a brake attitude control amount based on the first target attitude control amount, and outputs, when the value thus calculated is equal to or greater than the limit value, a brake attitude control amount that can be attained by the limit value. The brake attitude control amount outputted from the brake attitude control amount calculation unit 334 is outputted as a value obtained by multiplying the pitch rate suppressed by the brake 20 by CskyP. Note that, to a second target attitude control amount calculation unit 333 described later, a value converted into a pitch rate by a conversion unit 334a is outputted. Moreover, the brake control unit 2a calculates a braking torque control amount based on the brake attitude control amount corresponding to the limit value, and outputs the braking torque control amount to the brake control unit 2.

The second target attitude control amount calculation unit 333 calculates a second target attitude control amount that is a deviation between the first target attitude control amount and a value (hereinafter, this value is simply referred also as a brake attitude control amount) obtained by converting the brake attitude control amount into a pitch rate by the conversion unit 334a, and outputs the second target attitude control amount to the engine attitude control amount calculation unit 332.

In the engine attitude control amount calculation unit 332, a limit value for limiting an engine attitude control amount is set so as not to give any sense of discomfort to the vehicle driver, as with the brake 20. This limits the engine attitude control amount so as to be within a predetermined range of longitudinal acceleration when converted to a longitudinal acceleration. Accordingly, the second target attitude control amount calculation unit 333 calculates the engine attitude control amount based on the second target attitude control amount and outputs, when the value thus calculated is equal to or greater than the limit value, an engine attitude control amount that can be attained by the limit value. The engine attitude control amount outputted from the engine attitude control amount calculation unit 332 is outputted as a value obtained by multiplying the pitch rate suppressed by the engine 1 by CskyP. Note that, to a third target attitude control amount calculation unit 335 described later, a value, which is obtained by converting the engine attitude control amount into a pitch rate by a conversion unit 332a, is outputted. Moreover, the engine control unit 1a calculates an engine torque control amount based on the engine attitude control amount corresponding to the limit value, and outputs the engine torque control amount thus calculated to the engine 1.

The third target attitude control amount calculation unit 335 calculates a third target attitude control amount that is a deviation between the second target attitude control amount and a value (hereinafter, this value is simply referred also as an engine attitude control amount) obtained by converting the engine attitude control amount into the pitch rate by the conversion unit 332a, and outputs the third target attitude control amount to an S/A attitude control amount calculation unit 336. The S/A attitude control amount calculation unit 336 outputs a pitch attitude control amount corresponding to the third target attitude control amount. Moreover, the damping force control unit 35 calculates a damping force control amount based on the bounce attitude control amount, the roll attitude control amount, and the pitch attitude control amount (hereinafter, these are collectively referred to as an S/A attitude control amount), and outputs the same to S/A 3.

The engine attitude control amount calculation unit 332b calculates, based on an inputted first target attitude control amount, the engine attitude control amount that is a control amount that can be attained by the engine 1.

Also in the engine attitude control amount calculation unit 332b, a limit value for limiting an engine attitude control amount is set, as with the engine attitude control amount calculation unit 332. However, the limit value of the engine attitude control amount calculation unit 332b is set larger than the limit value of the engine attitude control amount calculation unit 332. This enables to increase the engine attitude control amount and suppress the pitch rate even if the control amount by S/A 3 decreases when S/A is abnormal. To the second target attitude control amount calculation unit 333b, a value converted into the pitch rate by the conversion unit 332c is outputted.

The engine attitude control amount calculation unit 332b calculates an engine attitude control amount so as to increase the control responsiveness of the engine 1 more than during normal time. Because S/A 3 is the portion directly related to the vehicle body attitude, the attitude control by S/A 3 immediately appears as a change in the vehicle body attitude. On the other hand, the attitude control by the engine 1 is slow as compared with the attitude control by S/A 3 because the result of applying an acceleration/deceleration to the vehicle appears as a change in the vehicle body attitude. When S/A is abnormal, the attitude control by S/A 3 might not sufficiently be performed and therefore by increasing the control responsiveness of the engine 1, it is possible to suppress decrease of the responsiveness of the vehicle body attitude control. Moreover, the engine control unit 1a calculates an engine torque control amount based on the engine attitude control amount corresponding to the limit value, and outputs the same to the engine 1.

The second target attitude control amount calculation unit 333b calculates a second target attitude control amount that is a deviation between the first target attitude control amount and a value, which is obtained by converting the engine attitude control amount into the pitch rate by the conversion unit 332c, and outputs the same to a brake attitude control amount calculation unit 334b.

In the brake attitude control amount calculation unit 334b, a limit value for limiting the brake attitude control amount is set, as with the brake attitude control amount calculation unit 334. However, the limit value of the brake attitude control amount calculation unit 334b is set larger than the limit value of the brake attitude control amount calculation unit 334. This enables to increase the brake attitude control amount and suppress the pitch rate even if the control amount by S/A 3 decreases when S/A is abnormal. To the third target attitude control amount calculation unit 335b, a value converted into the pitch rate by the conversion unit 332c is outputted.

The brake attitude control amount calculation unit 334b calculates a brake attitude control amount so as to increase the control responsiveness of the brake 20 more than during normal time. The attitude control by the brake 20 is slow as compared with the attitude control by S/A 3 because a result of applying deceleration to the vehicle appears as a change in the vehicle body attitude. When S/A is abnormal, the attitude control by S/A 3 might not sufficiently be performed and therefore by increasing the control responsiveness of the brake 20, it is possible to suppress decrease of the responsiveness of the vehicle body attitude control. Moreover, the brake control unit 2a calculates a braking torque control amount based on the brake attitude control amount corresponding to the limit value, and outputs the same to the brake control unit 2.

The third target attitude control amount calculation unit 335 calculates a third target attitude control amount that is a deviation between the second target attitude control amount and a value, which is obtained by converting the brake attitude control amount into the pitch rate, and outputs the same to the S/A attitude control amount calculation unit 336. The S/A attitude control amount calculation unit 336 outputs a pitch attitude control amount corresponding to the third target attitude control amount.

The damping force control unit 35 calculates a damping force control amount based on the bounce attitude control amount, the roll attitude control amount, and the pitch attitude control amount (the S/A attitude control amount), and outputs the same to S/A 3.

As described above, during normal time, with regard to the pitch rate, the first target attitude control amount is calculated, and then the brake attitude control amount is calculated, the engine attitude control amount is calculated from the second target attitude control amount that is the deviation between the first target attitude control amount and the brake attitude control amount, and the S/A attitude control amount is calculated from the third target attitude control amount that is the deviation between the second attitude control amount and the engine attitude control amount. Thus, the amount of the pitch rate control performed by S/A 3 can be reduced by the control of the engine 1 and the brake 20, and therefore the controllable range of S/A 3 can be set relatively narrow and the sprung attitude control can be attained with an inexpensive S/A 3.

Moreover, if the control amount by S/A 3 is increased, the damping force would basically increase. An increase of the damping force means a hard suspension property, and therefore when a high-frequency vibration is inputted from the road surface side, the high frequency input is likely to be transmitted, thus impairing the comfort of occupants (hereinafter, referred to as a deterioration of the high frequency vibration characteristic). On the other hand, the actuators, such as the engine 1 and the brake 20, which do not have an influence on the vibration transmission characteristics due to a road surface input, can suppress the pitch rate and reduce the control amount of S/A 3, thereby preventing the deterioration of the high-frequency vibration characteristic. The above-described effects can be obtained by determining the control amount of the engine 1 prior to S/A 3 and by determining the control amount of the brake 20 prior to S/A 3.

Moreover, the bounce rate and the pitch rate are set as the control objects for the engine 1 and the pitch rate is set as the control object for the brake 20, and therefore by determining the control amount of the brake 20 prior to the engine 1, it is possible to reduce the control amount of the pitch control by the engine 1 and thus the engine 1 can concentrate on the bounce control.

On the other hand, when S/A is abnormal, the limit value of the engine torque control amount and the limit value of the braking torque control amount are set larger than during normal time. Thus, the amount of the pitch rate control performed by S/A 3 can be further reduced by the control of the engine 1 and the brake 20, and therefore the sprung attitude control can be attained even when the controllable range becomes narrower due to a failure of S/A 3 than during normal time.

Moreover, because the limit value of the braking torque control amount is set larger, a strong sense of discomfort due to an unintended sense of deceleration might be given to the vehicle driver. In the control by the engine 1, because control both in the acceleration direction and in the deceleration direction is performed, the sense of acceleration/deceleration is small and the sense of discomfort which the vehicle driver feels is also small. Therefore, when S/A is abnormal, an increase in the sense of deceleration can be prevented by determining the control amount of the engine 1 prior to the brake 20 and reducing the control amount of the brake 20.

Figure 10:
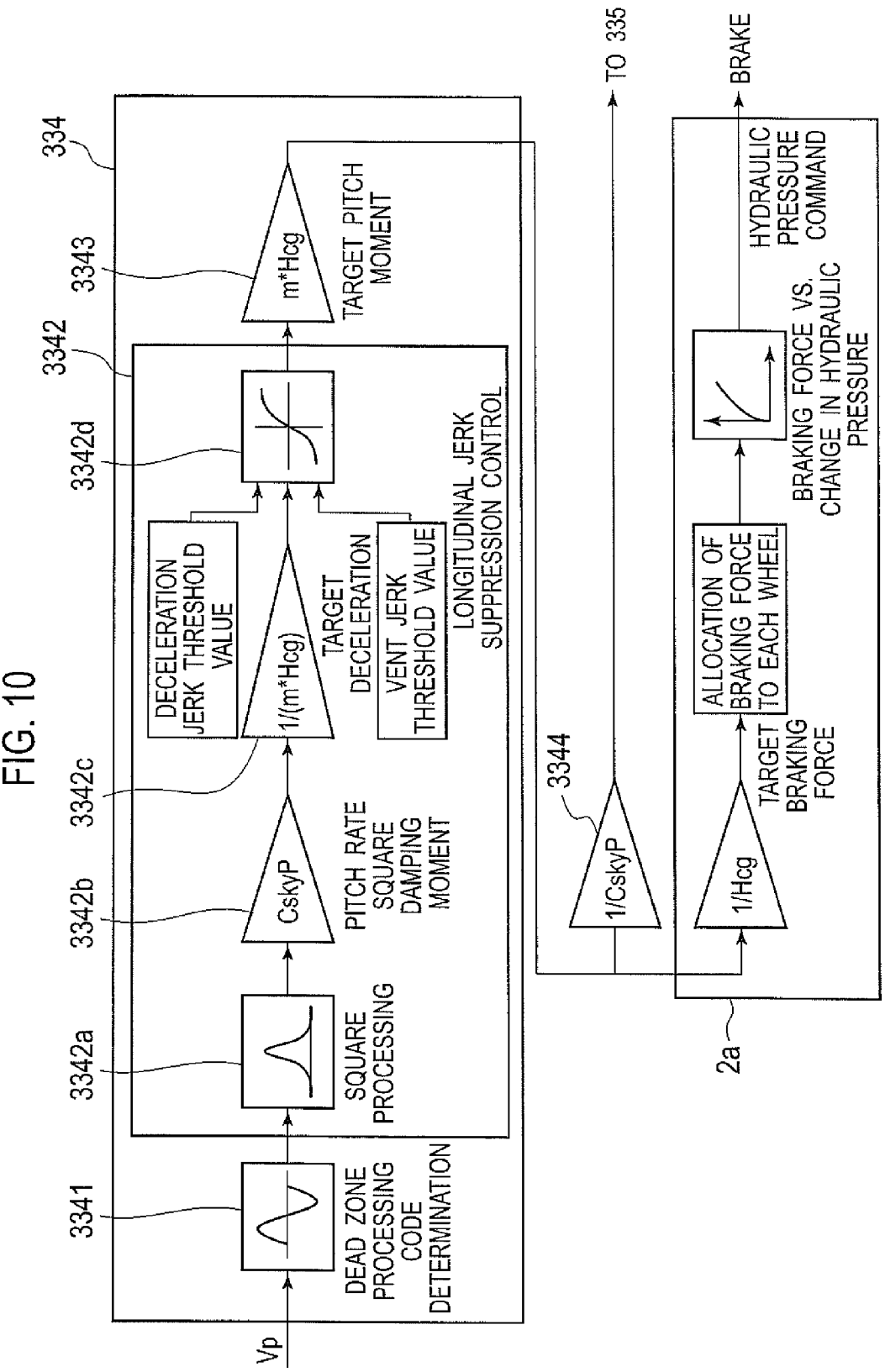
FIG. 10 is a control block diagram illustrating brake pitch control according to the first embodiment.

Here, the brake pitch control is described. Generally, because the brake 20 can control both of the bounce and the pitch, it can be also said that the brake 20 may preferably control the both. However, the bounce control by the brake 20 had a tendency to give the vehicle driver a discomfort feeling. This is because the bounce control by the brake 20 generates braking forces simultaneously to the four wheels in the direction with the low control priority to cause the strong sense of deceleration regardless of difficulty in obtaining a control effect. Therefore, the configuration specialized in the pitch control is employed in the brake 20. FIG. 10 is a control block diagram illustrating brake pitch control in the first embodiment. When a mass of the vehicle body is m, a front-wheel braking force is BFf, a rear-wheel braking force is BFr, a height between the vehicle gravity center and the road surface is Hcg, and an acceleration of the vehicle is a, a pitch moment is Mp, and a pitch rate is Vp, the following relational expression is established.

$$BFf+BFr=m \cdot a$$

$$m \cdot a \cdot Hcg = Mp$$

$$Mp=(BFf+BFr) \cdot Hcg$$

Here, if the braking force is applied when the pitch rate Vp is positive, that is, when the front-wheel side is depressed, the front-wheel side is further depressed to promote the pitch motion. Accordingly, in this case, no braking force is applied. In contrast, when the pitch rate Vp is negative, that is, the front-wheel side is lifted, the braking pitch moment applies a braking force to suppress the front-wheel side from being lifted. This secures a field of vision of the vehicle driver, and allows the vehicle driver to easily see the forward to contribute to improve the sense of security and the sense of flatness. From the above, the control amounts below are applied.

when Vp>0 (i.e. front wheels are depressed), Mp=0 when Vp≤0 (i.e. front wheels are lifted), Mp=CskyP·Vp

Accordingly, braking torque is generated only when the front side of the vehicle body is lifted. This enables the reduced deceleration to be generated compared with a case where braking torque is generated in both of the cases where the front side of the vehicle body is lifted and depressed. Moreover, only a half of the frequency of actuator operations is needed, thereby making it possible to employ the low-cost actuator.

Based on the above relation, the brake attitude control amount calculation unit 334 includes the following control blocks. A dead zone processing code determining unit 3341 determines the inputted code of the pitch rate Vp to output 0 to a deceleration sense reducing processor 3342 if the code is positive because no control is required, and outputs a pitch rate signal the deceleration sense reducing processor 3342 if the code is negative because it is determined that control is possible.

Next, deceleration sense reduction processing is described. This processing corresponds to the restriction by the above-described limit value performed in the brake attitude control amount calculation unit 334. A square processor 3342*a* squares a pitch rate signal. This inverts the sign and also smoothes the rising edge of a control force. A pitch rate square damping moment calculation unit 3342*b* calculates a pitch moment Mp by multiplying the squared pitch rate by the skyhook gain CskyP of the pitch term taking into consideration the squaring. A target deceleration calculating unit 3342*c* calculates a target deceleration by dividing the pitch moment Mp by the mass m and by the height Hcg between the center of gravity of the vehicle and the road surface.

A jerk threshold value limiting unit 3342*d* determines whether or not the change rate of the calculated target deceleration, that is, a jerk is within the ranges of the deceleration jerk threshold value and the remove jerk threshold value which are set in advance, and the target deceleration is within the range of the longitudinal acceleration limit value. If the jerk exceeds either of the threshold values, the target deceleration is corrected to be a value within the range of the jerk threshold value, and if the target deceleration exceeds the limit value, the target deceleration is set within the range of the limit value. This allows a deceleration to be generated in such a manner that no discomfort feeling is given to the vehicle driver.

A target pitch moment conversion unit 3343 calculates a target pitch moment by multiplying the target deceleration limited in the jerk threshold value limiting unit 3342*d* by the mass m and the height Hcg, and outputs the target pitch moment to the brake controller 2*a* and a target pitch rate conversion unit 334*a*. The target pitch rate conversion unit 334*a* divides the target pitch moment by the skyhook gain CskyP of the pitch term and converts the same to a target pitch rate (corresponding to the brake attitude control amount), and outputs the target pitch rate to the third target attitude control amount calculation unit 335.

Next, frequency-sensitive control processing in the sprung vibration suppression control unit is explained. In the first embodiment, the sprung vibration suppression control is attained by estimating a sprung speed basically on the basis of the detection value by the wheel speed sensor 5 and performing the skyhook control based on the sprung speed. However, there may be a case where it can be considered that the wheel speed sensor 5 may not assure the sufficient estimation accuracy, or a case where depending on the traveling status or the intention by the vehicle driver, a comfortable traveling state (not the sense of flatness of the vehicle body but a gentler and comfortable ride) is intended to be actively assured. In this case, a slight phase displacement might cause difficulty of adequate control in vector control in which the relation (phase or the like) between the signs of the stroke speed and the sprung speed such as the skyhook control. Accordingly, frequency-sensitive control that is sprung vibration suppression control in accordance with the scalar quantity of vibration characteristics has been decided to be introduced.

Figure 11:
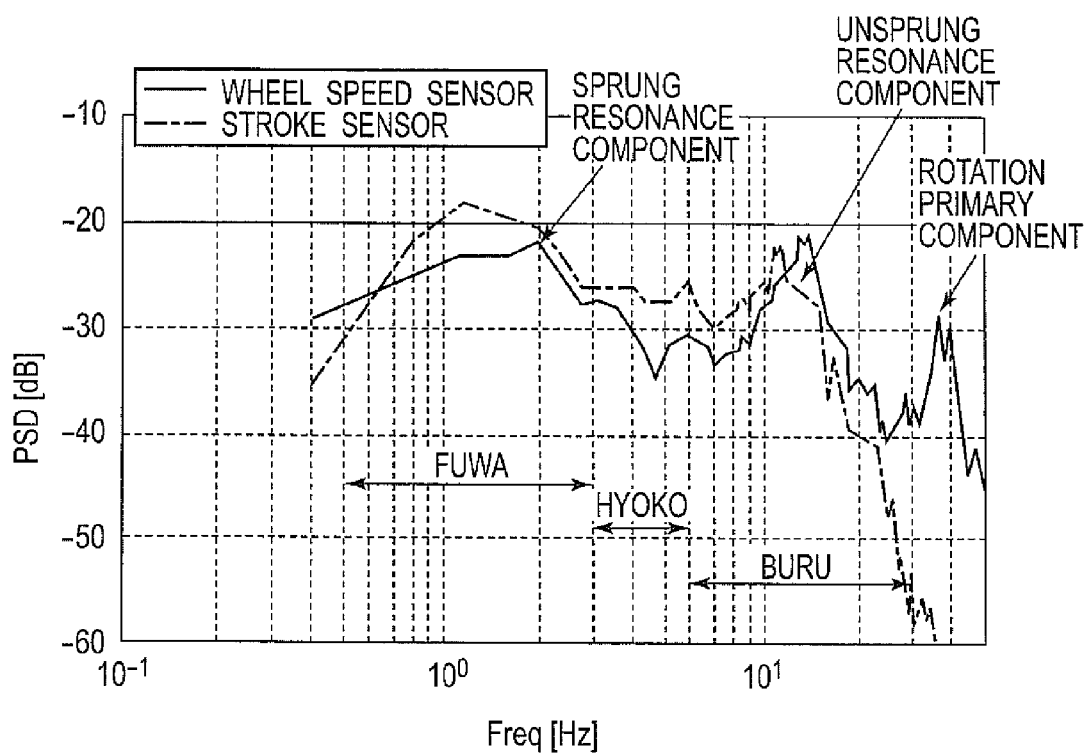
FIG. 11 is a graph illustrating both a wheel speed frequency characteristic detected by a wheel speed sensor and a stroke frequency characteristic of a stroke sensor that is not mounted in the embodiment.

FIG. 11 is a graph depicting both the wheel speed frequency characteristic detected by a wheel speed sensor and the stroke frequency characteristic by a stroke sensor that is not mounted in the embodiment. Here, the frequency characteristic is a characteristic, in which the magnitude of the amplitude with respect to the frequency is expressed by a vertical axis as a scalar quantity. When a frequency component of the wheel speed sensor 5 is compared with a frequency component of the stroke sensor, it is understood that the components from a sprung resonant frequency component to an unsprung resonant frequency component have a generally similar scalar quantity. Therefore, among the detection values of the wheel speed sensor 5, a damping force has been decided to be set based on this frequency characteristic. Here, a region where a sprung resonant frequency component is present is defined as a frequency region "fuwa" (0.5 to 3 Hz). The region "fuwa" is a frequency region that brings a sense of an occupant being thrown into the air because the entire body of the occupant is swung, in other words, a sense of decrease of the gravitational acceleration acting on the occupant. A region between the sprung resonant frequency component and the unsprung resonant frequency component is defined as a frequency region "hyoko" (3 to 6 Hz). The region "hyoko" is a frequency region which brings not a sense of decrease of the gravitational acceleration but a sense of wigglingly jumping of a human body in trotting a horse, in other words, which brings a vertical movement which the entire body can follow. A region where the unsprung resonant frequency component is present is defined as a frequency region "buru" (6 to 23 Hz). The region "buru" is a frequency region where not a vertical movement which the mass of a human body can follow but wiggling vibration is transmitted to a part of the body such as thighs of the occupant.

Figure 12:
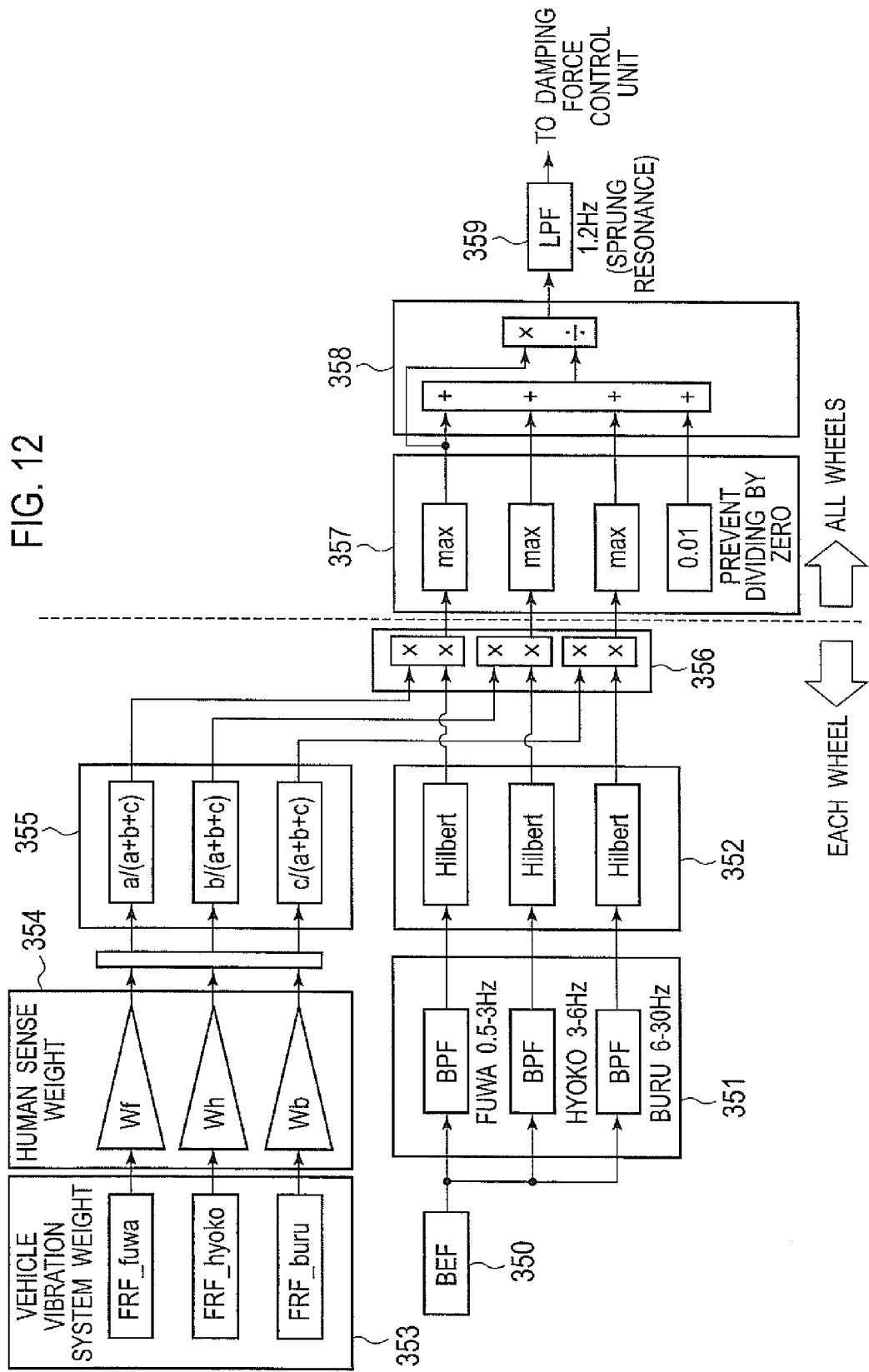
FIG. 12 is a control block diagram illustrating frequency-sensitive control in sprung vibration suppression control according to the first embodiment.

FIG. 12 is a control block diagram illustrating frequency-sensitive control in the sprung vibration suppression control in the first embodiment. A band elimination filter 350 cuts a noise other than the vibration component used for this control in the wheel speed sensor value. A predetermined frequency region dividing unit 351 divides the value into the respective frequency bands of the region fuwa, the region hyoko, and the region buru. A Hilbert transformation processor 352 Hilbert transforms the divided frequency bands to convert into scalar quantities (specifically, an area calculated from the amplitude and the frequency band) based on the amplitude of the frequency.

A vehicle vibration system weight setting unit 353 sets weights with which vibrations of the respective frequency bands of the region fuwa, the region hyoko, and the region buru are actually propagated to the vehicle. A human sense weight setting unit 354 sets weights with which vibrations of the respective frequency bands of the region fuwa, the region hyoko, and the region buru are propagated to the occupant.

A vehicle vibration system weight setting unit 353 sets weights with which vibrations in the respective frequency bands of the region "fuwa", the region "hyoko", and the region "hyoko" are actually propagated to the vehicle. A human sense weight setting unit 354 sets weights with which vibrations in the respective frequency bands of the region "fuwa", the region "hyoko", and the region "hyoko" are propagated to the occupant.

Figure 13:
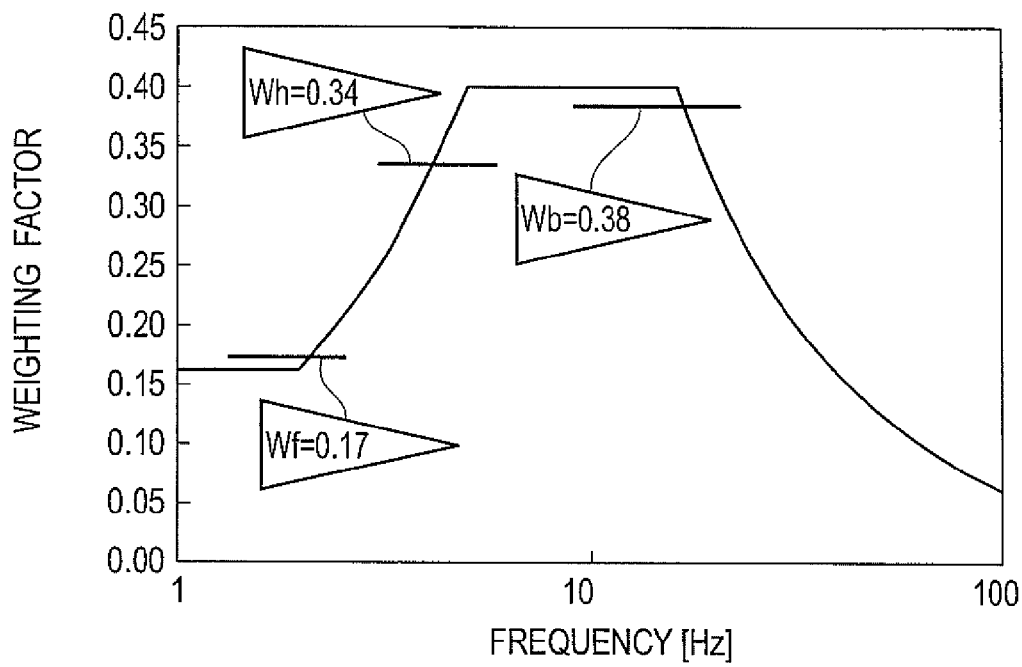
FIG. 13 is a correlation graph illustrating a human sense characteristic in each frequency region.

Here, setting a human sense weight is explained. FIG. 13 is a correlation graph illustrating a human sense characteristic with respect to the frequency. As shown in FIG. 13 (see also FIG. 15), in the region fuwa serving as a low frequency region, the sensitivity of the occupant with respect to the frequency is comparatively low. The sensitivity gradually increases as being moved in the higher-frequency region. Note that, the frequency is less likely to be transmitted to the occupant in the frequency region equal to or higher than the region buru. From the above, a human sense weight Wf in the region fuwa is set to 0.17, a human sense weight Wh in the region hyoko is set to 0.34 which is larger than the Wf, and a human sense weight Wb in the region buru is set to 0.38 which is further larger than the Wf and the Wh. This enables the correlation between the scalar quantity of each of the frequency bands and the vibration actually propagated to the occupant to increase. Note that, these two weight coefficients may be changed as appropriate in accordance with the concept of the vehicle or the preferences of the occupant.

A weight deciding unit 355 calculates a ratio in which a weight of each frequency band is occupied, out of weights of the respective frequency bands. When a weight of the region fuwa is a, a weight of the region hyoko is b, and a weight of the region buru is c, a weight coefficient of the region fuwa is (a/(a+b+c)), a weight coefficient of the region hyoko is (b/(a+b+c)), and a weight coefficient of the region buru is (c/(a+b+c)).

A scalar quantity calculation unit 356 outputs each final scalar quantity by multiplying the scalar quantity of each of the frequency bands calculated by the Hilbert transformation processor 352 by each of the weights calculated by the weight deciding unit 355. The foregoing processing is performed with respect to the wheel speed sensor value of each wheel.

A maximum value selection unit 357 selects the maximum value among the final scalar quantities calculated for the respective four wheels. Note that, 0.01 at the bottom portion is set to prevent the denominator from becoming zero because the total of maximum values is set as the denominator in the following processing. A rate calculation unit 358 calculates a rate by serving the total of the maximum values of the scalar quantities in the respective frequency bands as the denominator, and the maximum value of the scalar quantities in the frequency band corresponding to the region fuwa as the numerator. In other words, a mixing rate (hereinafter, described as simply a rate) of the region fuwa included in all the vibration components is calculated. A sprung resonance filter 359 performs filter processing of the sprung resonance frequency at approximately 1.2 Hz with respect to the calculated rate to extract a component of the sprung resonance frequency band showing the region fuwa from the calculated rate. In other words, because the region fuwa is present at approximately 1.2 Hz, it can be considered that the rate of this region may change at approximately 1.2 Hz. In addition, the sprung resonance filter 359 outputs the eventually extracted rate to the damping force control unit 35, and the frequency-sensitive damping force control amount in accordance with the rate is outputted.

Figure 14:
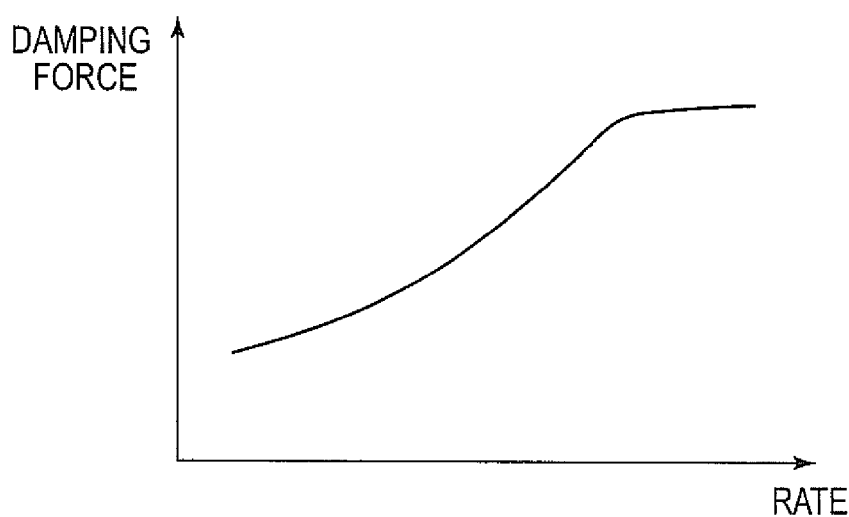
FIG. 14 is a characteristic graph illustrating a relation between a vibration mixing rate and a damping force in a region "fuwa" by the frequency-sensitive control according to the first embodiment.

FIG. 14 is a characteristic graph illustrating a relation between the vibration mixing rate of the frequency region fuwa by the frequency-sensitive control and the damping force in the first embodiment. As shown in FIG. 14, setting a higher damping force when the rate of the region fuwa is high reduces a sprung resonance vibration level. In this process, because the rate of the region hyoko or the region buru is low, even if a higher damping force is set, high frequency vibration or wiggling vibration is not transmitted to the occupant. In contrast, when the rate of the region fuwa is low, setting a lower damping force decreases vibration transmission characteristic equal to or higher than the sprung resonance. Accordingly, the high frequency vibration is suppressed, thereby obtaining a smooth ride.

Figure 15:
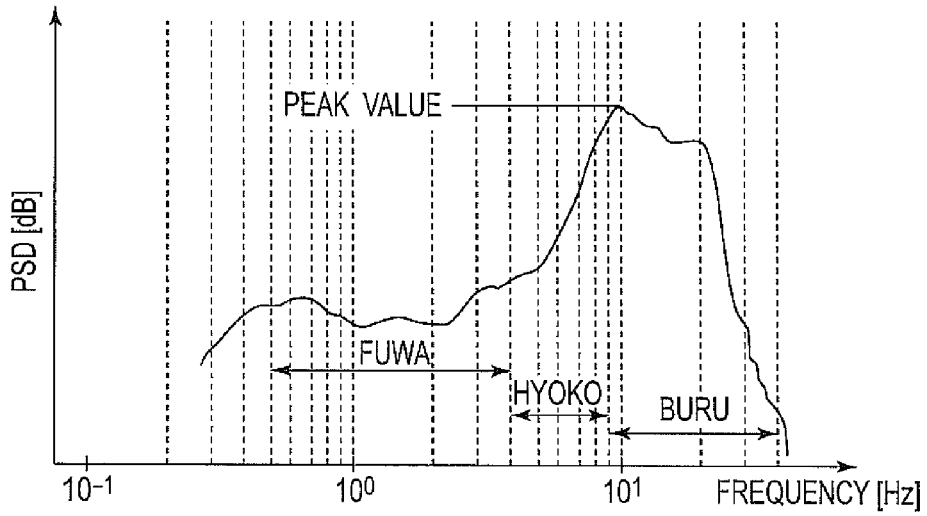
FIG. 15 is a graph illustrating a wheel speed frequency characteristic detected by the wheel speed sensor under a certain traveling condition.

Here, an advantage of the frequency-sensitive control when the frequency-sensitive control is compared with the skyhook control is explained. FIG. 15 is a graph illustrating a frequency characteristic of the stroke speed detected by the wheel speed sensor 5 in a certain traveling condition. This is a characteristic shown in a case where the vehicle is traveling on a road surface with continuous small recesses and projections especially such as a stone-paved road. If performing the skyhook control during traveling on the road surface showing such a characteristic, a damping force is determined at a peak value of the amplitude in the skyhook control. Accordingly, the worse estimation of phase with respect to inputs of the high frequency vibration results in an extremely high damping force to be set at the wrong timing, thereby causing a problem that the high frequency vibration becomes worse.

In contrast, in a case of the control such as the frequency-sensitive control on the basis of the scalar quantity not the vector, a low damping force is set on the road surface as shown in FIG. 15 because the rate of the region fuwa is small. Accordingly, even when the amplitude of vibration in the region buru is large, the vibration transmission characteristic sufficiently decreases, thereby making it possible to prevent the high frequency vibration from becoming worse. From the above, in a region where the skyhook control is difficult to be performed because the estimation accuracy becomes worse even if a costly sensor or the like is provided, the high frequency vibration can be suppressed by the frequency-sensitive control based on the scalar quantity.

Next, a configuration of the unsprung vibration suppression control unit is explained. As explained in the conventional vehicle of FIG. 8(a), the resonance frequency band is present because tires also include the elastic coefficient and the damping coefficient. However, because the mass of the tire is smaller than the sprung mass and the elastic coefficient thereof is also high, the unsprung resonance is present at the higher frequency side than the sprung resonance. This unsprung resonance component causes the tires to be flapping in the unsprung portion, and the road holding might become worse. Moreover, the flapping in the unsprung portion might give the occupant an unpleasant feeling. Therefore, in order to suppress the flapping due to the unsprung resonance, a damping force in accordance with the unsprung resonance component is set.

Figure 16:
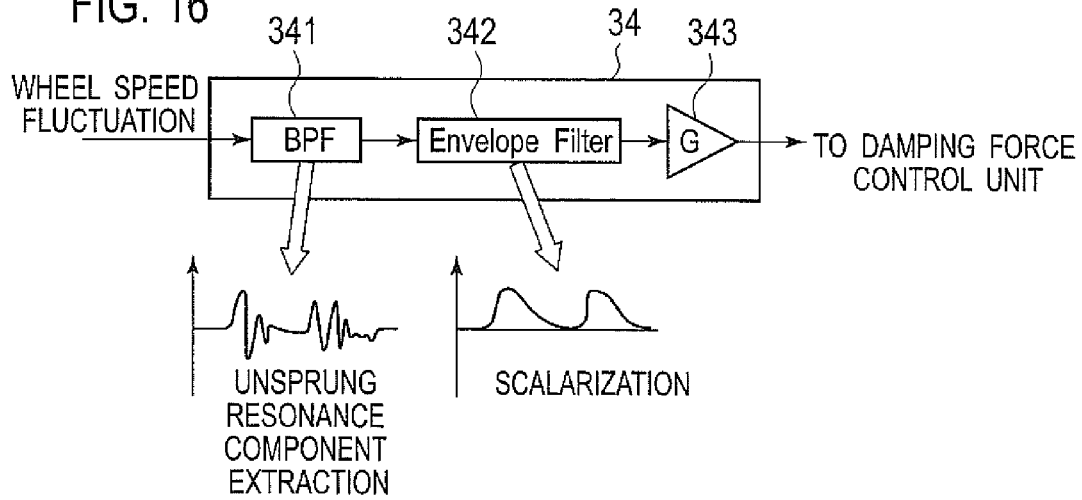
FIG. 16 is a block diagram illustrating a control configuration of unsprung vibration suppression control according to the first embodiment.

FIG. 16 is a block diagram illustrating a control configuration of unsprung vibration suppression control in the first embodiment. An unsprung resonance component extract unit 341 causes a band-pass filter to act on the wheel speed variation outputted from a deviation calculation unit 321b in the traveling-state estimator 32 to extract an unsprung resonance component. The unsprung resonance component is extracted from a region of approximately 10 to 20 Hz out of the wheel speed frequency components. An envelope waveform forming unit 342 performs scalarization on the extracted unsprung resonance component to form an envelope waveform using Envelope Filter. A gain multiply unit 343 multiplies the scalarized unsprung resonance component by a gain to calculate an unsprung vibration suppression damping force control amount, and outputs the unsprung vibration suppression damping force control amount to the damping force control unit 35. Note that, in the first embodiment, it has been decided that an unsprung resonance component is extracted by applying a band-pass filter to the value detected by a wheel speed sensor, but the traveling-state estimator 32 may calculate, by estimation, the unsprung speed in addition to the sprung speed to extract the unsprung resonance component.

Figure 17:
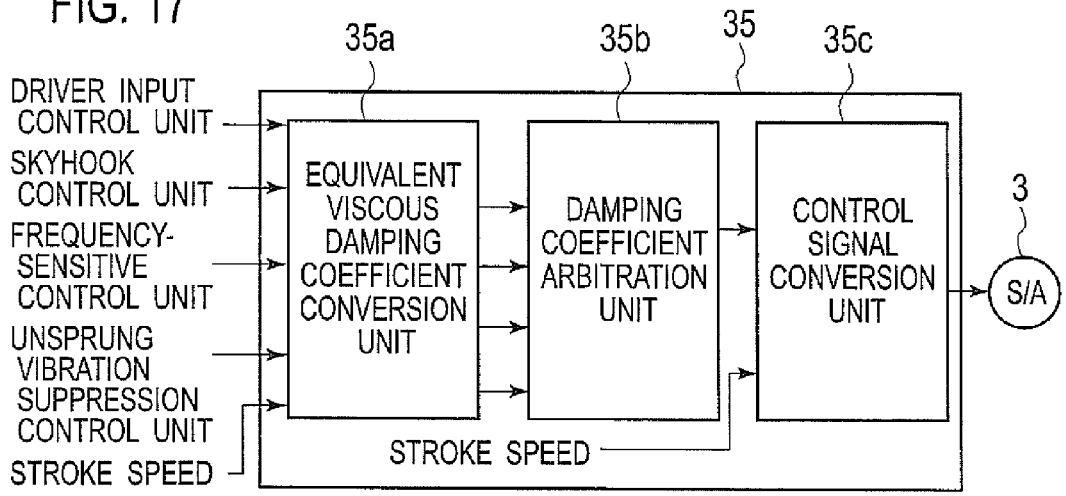
FIG. 17 is a control block diagram illustrating a control configuration of the damping force control unit according to the first embodiment.

Next, a configuration of the damping force control unit 35 is explained. FIG. 17 is a control block diagram illustrating a control configuration of the damping force control unit in the first embodiment. An equivalent viscous damping coefficient conversion unit 35a is inputted with the driver input damping force control amount outputted from the driver-input control unit 31, the S/A attitude control amount outputted from the skyhook control unit 33a, the frequency-sensitive damping force control amount outputted from a frequency-sensitive control unit 33b, the unsprung vibration suppression damping force control amount outputted from the unsprung vibration suppression control unit 34, and the stroke speed calculated by the traveling-state estimator 32, and coverts these values into equivalent viscous damping coefficients.

A damping coefficient arbitration unit 35b arbitrates among the damping coefficients (hereinafter, the respective damping coefficients are described as a driver input damping coefficient k1, an S/A attitude damping coefficient k2, a frequency-sensitive damping coefficient k3, and an unsprung vibration suppression damping coefficient k4) converted in the equivalent viscous damping coefficient conversion unit 35a to decide a damping coefficient on which the control is based, and outputs a final damping coefficient. A control signal conversion unit 35c converts the value into a control signal (command current value) with respect to the S/A 3 on the basis of the damping coefficient arbitrated by the damping coefficient arbitration unit 35b and the stroke speed, and outputs the control signal to the S/A 3.

Next, the arbitration content of the damping coefficient arbitration unit 35b is explained. The control apparatus for a vehicle in the first embodiment includes four control modes as follow: firstly, a standard mode assuming a state where a moderate turning state can be obtained while traveling in a normal urban area or the like; secondly, a sports mode assuming a state where a stable turning state can be obtained while actively traveling on a winding road or the like; thirdly, a comfort mode assuming a traveling state where priority is given to a ride comfort at the time of start at a low-vehicle speed or the like; and fourthly, a highway mode assuming a state of traveling on a superhighway most of which is in a straight line state or the like at a high-vehicle speed.

In the standard mode, such control is performed that priority is given to the unsprung vibration suppression control by the unsprung vibration suppression control unit 34 while performing the skyhook control by the skyhook control unit 33a.

In the sports mode, the skyhook control by the skyhook control unit 33a and the unsprung vibration suppression control by the unsprung vibration suppression control unit 34 are performed while giving priority to the driver-input control by the driver-input control unit 31.

In the comfort mode, such control is performed that priority is given to the unsprung vibration suppression control by the unsprung vibration suppression control unit 34 while performing the frequency-sensitive control by the frequency-sensitive control unit 33b.

In the highway mode, such control is performed that the control amount of the unsprung vibration suppression control by the unsprung vibration suppression control unit 34 is added to the skyhook control by the skyhook control unit 33a while giving priority to the driver-input control by the driver-input control unit 31.

Hereinafter, arbitration for each damping coefficient in each of these modes is explained.

Figure 18:
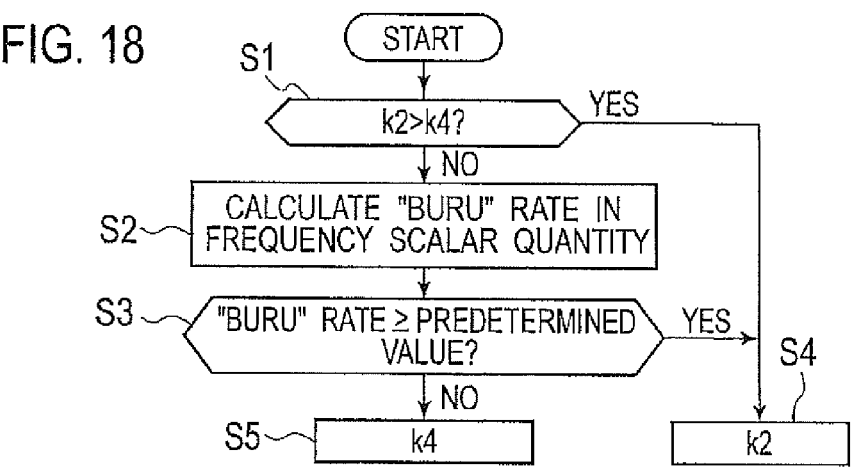
FIG. 18 is a flowchart illustrating damping coefficient arbitration processing in a standard mode according to the first embodiment.

FIG. 18 is a flowchart illustrating damping coefficient arbitration processing in the standard mode in the first embodiment. At Step S1, it is determined whether or not the S/A attitude damping coefficient k2 is larger than the unsprung vibration suppression damping coefficient k4. If larger, the process proceeds to Step S4 and the k2 is set as a damping coefficient.

At Step S2, on the basis of the scalar quantities of the region fuwa, the region hyoko, and the region buru, which have been explained in the explanation of the frequency-sensitive control unit 33b, a rate (scalar quantity) of the region buru is calculated.

At Step S3, it is determined whether or not the rate of the region buru is a predetermined value or higher. If the predetermined value or higher, because there is a concern that a ride comfort might become worse due to the high frequency vibration, the process proceeds to Step S4 and the k2 that is a low value is set as a damping coefficient. In contrast, if the rate of the region buru is less than the abovementioned predetermined value, because a ride comfort is less likely to become worse due to the high frequency vibration even if a high damping coefficient is set, the process proceeds to Step S5 and the k4 is set.

As described the above, in the standard mode, priority is given to the unsprung vibration suppression control which suppresses the unsprung resonance in principle. However, when the damping force requested by the skyhook control is lower than the damping force requested by the unsprung vibration suppression control and the rate of the region buru is larger, the damping force of the skyhook control is set, thereby preventing the high frequency vibration characteristic from becoming worse caused with satisfying the request of the unsprung vibration suppression control. This allows the optimal damping characteristic according to the traveling state to be obtained, thereby making it possible to simultaneously prevent the ride comfort from becoming worse due to the high frequency vibration while attaining the sense of flatness of the vehicle body.

Figure 19:
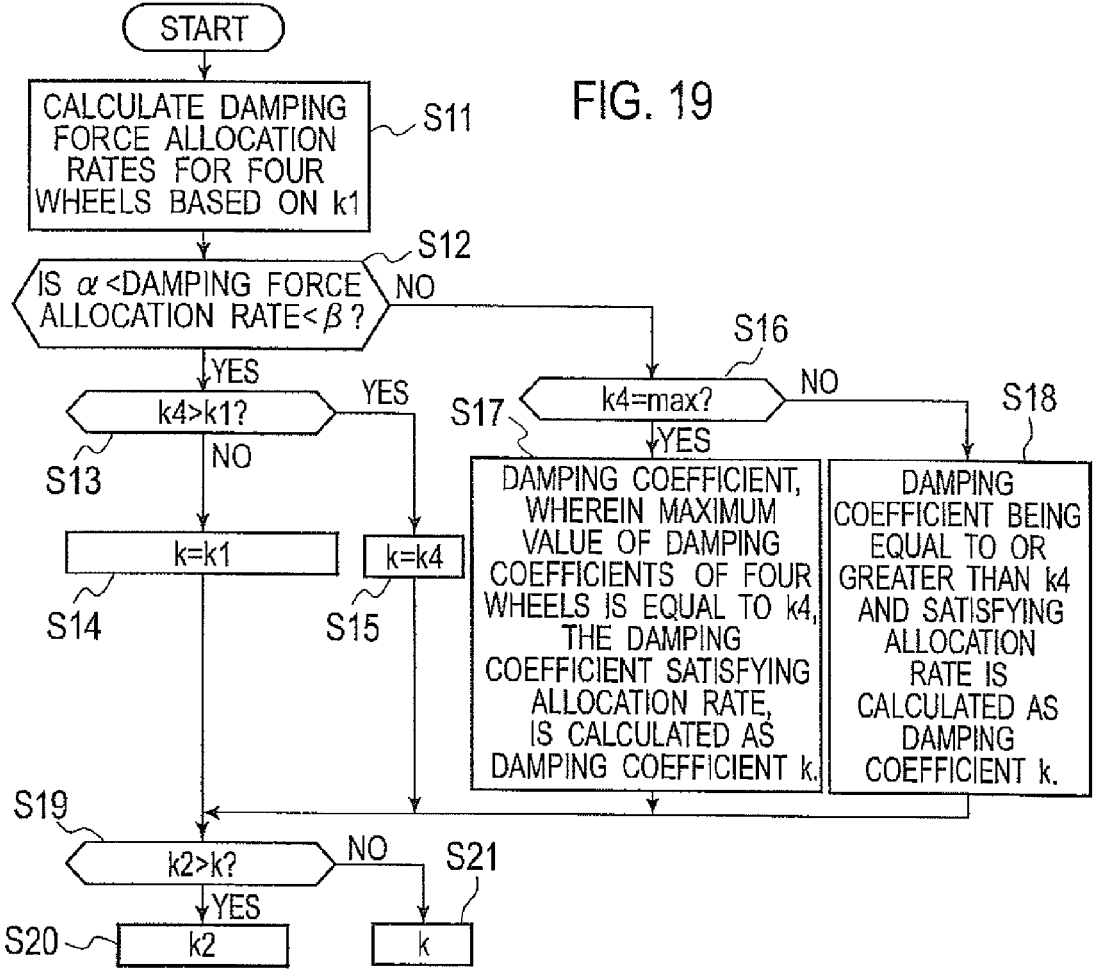
FIG. 19 is a flowchart illustrating the damping coefficient arbitration processing in a sports mode according to the first embodiment.

FIG. 19 is a flowchart illustrating damping coefficient arbitration processing in the sports mode in the first embodiment. In Step S11, damping force distribution ratios of the four wheels are calculated on the basis of the four-wheel driver input damping coefficients k1 set by the driver-input control. When a driver input damping coefficient of the right front-wheel is k1fr, a driver input damping coefficient of the left front-wheel is k1fl, a driver input damping coefficient of the right rear-wheel is k1rr, a driver input damping coefficient of the left rear-wheel is k1rl, and the damping force distribution ratios of the respective wheels are xfr, xfl, xrr, and xrl, the damping force distribution ratios of the four wheels are calculated by the following equations.

$$xfr=k1fr/(k1fr+k1fl+k1rr+k1rl)$$

$$xfl=k1fl/(k1fr+k1fl+k1rr+k1rl)$$

$$xrr=k1rr/(k1fr+k1fl+k1rr+k1rl)$$

$$xrl=k1rl/(k1fr+k1fl+k1rr+k1rl)$$

In Step S12, it is determined whether or not each of the damping force distribution ratios x is within a predetermined range (larger than α and smaller than β). If within the predetermined range, it is determined that the distribution to each wheel is nearly equivalent, and the process proceeds to Step S13, whereas even if any one of these is out of the predetermined range, the process proceeds to Step S16.

At Step S13, it is determined whether or not the unsprung vibration suppression damping coefficient k4 is larger than driver input damping coefficient k1. If it is determined larger, the process proceeds to Step S15 and the k4 is set as a first damping coefficient k. In contrast, if it is determined that the unsprung vibration suppression damping coefficient k4 is equal to or less than the driver input damping coefficient k1, the process proceeds to Step S14 and the k1 is set as the first damping coefficient k.

In Step S16, it is determined whether or not the unsprung vibration suppression damping coefficient k4 is a maximum value max that the S/A 3 can set. If it is determined as the maximum value max, the process proceeds to Step S17, whereas in other cases, the process proceeds to Step S18.

In Step S17, a damping coefficient in which the maximum value of the driver input damping coefficients k1 of the four wheels is the unsprung vibration suppression damping coefficient k4 and the damping force distribution ratio is satisfied is calculated as the first damping coefficient k. In other words, a value having the highest damping coefficient while satisfying the damping force distribution ratio is calculated.

In Step S18, a damping coefficient in which all the driver input damping coefficients k1 of the four wheels are within the range of the k4 or higher and the damping force distribution ratio is satisfied is calculated as the first damping coefficient k. In other words, a value which satisfies the damping force distribution ratio set by the driver-input control and also satisfies the request at the unsprung vibration suppression control side is calculated.

In Step S19, it is determined whether or not the first damping coefficient k set in the abovementioned respective steps is smaller than the S/A attitude damping coefficient k2 set by the skyhook control. If it is determined smaller, because the damping coefficient requested from the skyhook control side is larger, the process proceeds to Step S20 and the k2 is set. In contrast, is it is determined that the k is k2 or higher, the process proceeds to Step S21 and the k is set.

As described the above, in the sports mode, priority is given to the unsprung vibration suppression control which suppresses the unsprung resonance in principle. However, the damping force distribution ratio requested from the driver-input control side is closely related to the vehicle body attitude, specially is deeply related to the visual-line change of the driver by the roll mode. Accordingly, the highest priority is given to secure the damping force distribution ratio, not the damping coefficient requested from the driver-input control side itself. Moreover, as for a motion that brings attitude change of the in a state where the damping force distribution ratio is kept, the stable vehicle body attitude can be maintained by selecting the skyhook control at the select-high.

Figure 20:
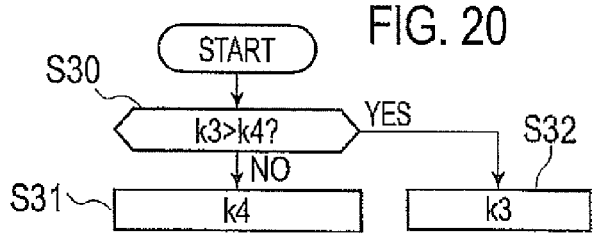
FIG. 20 a flowchart illustrating the damping coefficient arbitration processing in a comfort mode according to the first embodiment.

FIG. 20 is a flowchart illustrating damping coefficient arbitration processing mode in the comfort mode in the first embodiment. In Step S30, it is determined whether or not the frequency-sensitive damping coefficient k3 is larger than the unsprung vibration suppression damping coefficient k4. If it is determined larger, the process proceeds to Step S32 and the frequency-sensitive damping coefficient k3 is set. In contrast, if it is determined that the frequency-sensitive damping coefficient k3 is equal to or less than the unsprung vibration suppression damping coefficient k4, the process proceeds to Step S31 and the unsprung vibration suppression damping coefficient k4 is set.

As described the above, in the comfort mode, basically priority is given to the unsprung resonance control which suppresses the unsprung resonance. The frequency-sensitive control is originally performed as the sprung vibration suppression control to set the optimal damping coefficient in accordance with the status of the road surface, thereby making it possible to attain the control of securing a ride comfort. This allows the unsprung vibration suppression control to prevent the less sense of road holding due to the unsprung flapping. Note that, the comfort mode may be configured such that, similar to the standard mode, the damping coefficients are switched according to the buru rate in a frequency scalar quantity. This allows a ride comfort to be further secured as a super-comfort mode.

FIG. 21 is a flowchart illustrating damping coefficient arbitration processing in the highway mode in the first embodiment. Note that, the arbitration processing from Step S11 to Step S18 is the same as that in the sports mode, and therefore explanation thereof is omitted.

In Step S40, the S/A attitude damping coefficient k2 by the skyhook control is added to the first damping coefficient k having arbitrated before Step S18, and the added value is outputted.

As described the above, in the highway mode, the damping coefficient is arbitrated using the value obtained by adding the S/A attitude damping coefficient k2 to the arbitrated first damping coefficient k. Here, the effect is explained using the drawing. FIG. 22 is a time chart illustrating change of the damping coefficient when traveling on a wave road surface and an uneven road surface. For example, when a motion such that a vehicle body wobbles by the influence due to slight waves or the like on the road surface motion is intended to be suppressed during traveling at a high-vehicle speed, a slight stroke speed is required to be detected for the control attained by only the skyhook control. Accordingly, the much higher skyhook control gain is required to be set. In this case, although the wobbling motion can be suppressed, the excessive damping force control might be performed because the control gain is too large when recesses and projections on the road surface are generated. This causes a concern that the ride comfort might become worse or the vehicle body attitude might become worse.

In contrast, because the first damping coefficient k is set all the time in the highway mode, the damping force to some extent is secured all the time. This makes it possible to suppress the wobbling motion of the vehicle body with the smaller damping coefficient by the skyhook control. Moreover, because the skyhook control gain is not required to be increased, it is possible to cope with the recesses and projections on the road surface with the normal control gain. In addition, because the skyhook control is performed in a state where the first damping coefficient k is set, different from the damping coefficient limit, an operation of decreasing step the damping coefficient is possible in the semi-active control region. This secures a stable vehicle attitude when traveling at a high speed.

Next, mode selection processing which selects the above-mentioned respective traveling modes is explained. FIG. 23 is a flowchart illustrating mode selection processing in a damping coefficient arbitration unit based on a traveling state according to the first embodiment.

In Step S50, it is determined whether or not a straight ahead traveling state on the basis of the value by the steering angle sensor 7. If it is determined as the straight ahead traveling state, the process proceeds to Step S51, whereas if it is determined as a turning state, the process proceeds to Step S54.

In Step S51, it is determined whether or not the vehicle is equal to or higher than a predetermined vehicle speed VSP1 indicating a high-vehicle speed state on the basis of the value by the vehicle speed sensor 8. If it is determined as the VSP1 or higher, the process proceeds to Step S52 and the standard mode is selected. In contrast, if it is determined as less than the VSP1, the process proceeds to Step S53 and the comfort mode is selected.

In Step S54, it is determined whether or not the vehicle is equal to or higher than a predetermined vehicle speed VSP1 indicating a high-vehicle speed state on the basis of the value by the vehicle speed sensor 8. If it is determined as the VSP1 or higher, the process proceeds to Step S55 and the highway mode is selected. In contrast, if it is determined as less than the VSP1, the process proceeds to Step S56 and the sports mode is selected.

In other words, in the straight ahead traveling state, it is possible to stabilize the vehicle body attitude by the skyhook control by selecting the standard mode when traveling at a high-vehicle speed, to secure a ride comfort by suppressing the high frequency vibration such as the hyoko or the buru, and, in addition, to suppress the unsprung resonance. Moreover, selecting the comfort mode when traveling at a low-vehicle speed makes it possible to suppress the unsprung resonance while suppressing the vibration such as the hyoko or the buru to be inputted to the occupant as much as possible.

In contrast, in the turn traveling state, selecting the highway mode when traveling at a high-vehicle speed makes it possible to basically obtain the high damping force because the control is performed by the value to which the damping coefficient is added. This allows the unsprung resonance to be suppressed while actively securing the vehicle body attitude when being turned by the driver-input control even at a high-vehicle speed. Moreover, selecting the sports mode when traveling at a low-vehicle speed makes it possible to suppress the unsprung resonance while actively securing the vehicle body attitude when being turned by the driver-input control and performing the skyhook control as appropriate, and to travel in the stable vehicle attitude.

Note that, with respect to the mode selection processing, a control example is indicated in the first embodiment that a traveling state is detected to automatically switch the mode. However, for example, control is made such that a switch or the like that a vehicle driver can operate is provided to select a traveling mode. Accordingly, a ride comfort or a turn performance in accordance with the traveling intention by the vehicle driver can be obtained.

The first embodiment exhibits functional effects listed below.

(1) The control apparatus for a vehicle includes: the brake attitude control amount calculation unit 334 (braking/driving force attitude control amount calculation unit) configured to calculate a brake attitude control amount (braking/driving force attitude control amount) controlled by the braking force of the brake 20 (braking force of the vehicle) so that a pitch rate (vehicle body attitude) becomes a flat attitude (target attitude); the engine attitude control amount calculation unit 332 (braking/driving force attitude control amount calculation unit) configured to calculate an engine attitude control amount (braking/driving force attitude control amount calculation amount) controlled by the braking force (driving force of the vehicle) of the engine 1 so that a pitch rate (vehicle body attitude) becomes a flat attitude (target attitude); and the S/A attitude control amount calculation unit 336 and damping force control unit 35 (damping force control unit) configured to control the damping force of S/A 3 (shock absorber) based on a brake attitude control amount and an engine attitude control amount. The control apparatus for a vehicle further includes: the wheel speed sensor 5 (traveling-state detector) that detects a wheel speed (traveling state of the vehicle); the first target attitude control amount calculation unit 331 (the target attitude control amount calculation unit configured to calculate a target attitude control amount of the vehicle body based on the traveling state) configured to calculate a first target attitude control amount for controlling the vehicle body attitude so that the pitch rate detected by the wheel speed sensor 5 becomes a flat attitude; and the abnormality detection unit 337 configured to detect an abnormality of S/A 3, wherein the brake attitude control amount calculation unit 334 and the engine attitude control amount calculation unit 332b (braking/driving force attitude control amount calculation unit), when an abnormality is detected by the abnormality detection unit 337, calculate, based on the first target attitude control amount, an engine attitude control amount controlled by a driving force of the engine 1 and a brake attitude control amount controlled by a braking force of the brake 20.

That is, even when S/A is abnormal, the vehicle body attitude can be controlled by the engine 1 and the brake 20. Note that, in the first embodiment, the wheel speed sensor 5 is used as the traveling-state detector, but a stroke sensor, a sprung vertical acceleration sensor, or the like may be adopted to detect the traveling state. Moreover, in the first embodiment, although an example has been shown in which vehicle body attitude control is performed by the skyhook control, the control may be attained by other vehicle body attitude control. Moreover, in the first embodiment, although a control object is the pitch rate, the control object may be a bounce rate or the like. Moreover, in the first embodiment, the target attitude is a flat attitude, but for example from a viewpoint of securing the field of vision of the vehicle driver during turning, a slightly nose-diving vehicle body attitude may be a target attitude.

(2) The engine attitude control amount calculation unit 332b (driving force attitude control amount calculation unit), when an abnormality is detected by the abnormality detection unit 337, calculates an engine attitude control amount controlled by the driving force of the engine 1, based on the first target attitude control amount. The brake attitude control amount calculation unit 334b, when an abnormality is detected by the abnormality detection unit 337, calculates a brake attitude control amount controlled by the braking force of the brake 20, based on the first target attitude control amount and the engine attitude control amount.

That is, even when S/A is abnormal, the vehicle body attitude can be controlled by the engine 1 and the brake 20. At this time, because the brake 20 can perform the control only in the deceleration direction, the control by the brake 20 might give an unintended sense of deceleration to the vehicle driver and give a strong sense of discomfort. In the control by the engine 1, because control both in the acceleration direction and in the deceleration direction is performed, the sense of acceleration/deceleration is small and the sense of discomfort which the vehicle driver feels is also small. Therefore, when S/A is abnormal, an increase in the sense of deceleration can be prevented by determining the control amount of the engine 1 prior to the brake 20 and reducing the control amount of the brake 20.

Note that, in the first embodiment, the shock absorber attitude control amount is calculated based on a value obtained by excluding the brake attitude control amount and the engine attitude control amount from the first target attitude control amount, but not limited thereto. For example, the shock absorber attitude control amount may be calculated based on a rate of the first target attitude control amount, the brake attitude control amount, and the engine attitude control amount, or the shock absorber attitude control amount may be calculated from a map with the above-described three control amounts as parameters, other than the rate.

Moreover, although in the first embodiment an example of using the engine as the driving power source has been shown, the driving power source is a travelling motor in the case of an electric vehicle, and an engine and a motor generator in the case of a hybrid vehicle, and also from the view point of controlling the driving force, the driving force control may be performed using a transmission or the like interposed between a driving power source and a drive wheel.

(3) The brake attitude control amount calculation unit 334b calculates a brake attitude control amount based on a value obtained by excluding the engine attitude control amount from the first target attitude control amount. Accordingly, because the brake attitude control amount can be reduced by the engine attitude control amount, the sense of deceleration can be reduced.

(4) The engine attitude control amount calculation units 332 and 332b have a limit value for limiting the engine attitude control amount to a predetermined value, and the engine attitude control amount calculation unit 332b increases the limit value when an abnormality is detected by the abnormality detection unit 337.

Because the amount of the pitch rate control performed by S/A 3 can be further reduced by the control of the engine 1, the sprung attitude control can be attained even when the controllable range becomes narrower due to a failure of S/A 3 than during normal time.

(5) The brake attitude control amount calculation units 334 and 334b have a limit value for limiting the brake attitude control amount to a predetermined value, and the brake attitude control amount calculation unit 334b increases the limit value when an abnormality is detected by the abnormality detection unit 337.

Because the amount of the pitch rate control performed by S/A 3 can be further reduced by the control of the brake 20, the sprung attitude control can be attained even when the controllable range becomes narrower due to a failure of S/A 3 than during normal time.

(6) The engine attitude control amount calculation unit 332b, when an abnormality is detected by the abnormality detection unit 337, calculates the engine attitude control amount so as to increase the control responsiveness of the driving force of the engine 1 than when an abnormality has not been detected yet. By increasing the control responsiveness of the driving force of the engine 1, it is possible to suppress deterioration of the responsiveness of the vehicle body attitude control due to insufficient attitude control by S/A 3.

(7) The brake attitude control amount calculation unit 334b, when an abnormality is detected by the abnormality detection unit 337, calculates the brake attitude control amount so as to increase the control responsiveness of the braking force of the brake 20 than when an abnormality has not been detected yet. By increasing the control responsiveness of the braking force of the brake 20, it is possible to suppress deterioration of the responsiveness of the vehicle body attitude control due to insufficient attitude control by S/A 3.

(8) The control apparatus for a vehicle includes: the skyhook control unit 33a (controller) configured to calculate a brake attitude control amount (braking/driving force attitude control amount), an engine attitude control amount (braking/driving force attitude control amount), and a shock absorber attitude control amount (damping force attitude control amount) so that a pitch rate (vehicle body attitude) becomes a flat attitude (target attitude); the brake 20 (braking/driving source) that generates a braking force corresponding to the brake attitude control amount; the engine 1 (braking/driving source) that generates a driving force corresponding to the engine attitude control amount; and S/A 3 (shock absorber) that generates a damping force corresponding to the shock absorber attitude control amount. The control apparatus for a vehicle further includes: the wheel speed sensor 5 (sensor to detect the traveling state of the vehicle); and the abnormality detection unit 337 configured to detect an abnormality of S/A 3, wherein the skyhook control unit 33a, when an abnormality is detected by the abnormality detection unit 337, calculates the engine attitude control amount (braking/driving force attitude control amount) and the brake attitude control amount (braking/driving force attitude control amount) based on a first target attitude control amount (target attitude control amount of the vehicle body) calculated from a traveling state. That is, even when S/A is abnormal, the vehicle body attitude can be controlled by the engine 1 and the brake 20.

(9) The brake controller 2a, the engine controller 1a, and the S/A controller 3a (controller) calculate a brake attitude control amount (braking/driving force control amount) controlled by the braking force of the brake 20, an engine attitude control amount (braking/driving force attitude control amount) controlled by a driving force of the engine 1, and a shock absorber attitude control amount (damping force attitude control amount) controlled by a damping force of S/A 3 (shock absorber) so that a pitch rate (vehicle body attitude) becomes a flat attitude (target attitude). When an abnormality occurs in S/A 3, the above-described three controllers calculate a first target attitude control amount (target attitude control amount) based on the traveling state of the vehicle, and control the first target attitude control amount by the driving force of the engine 1 and the braking force of the brake 20. That is, even when S/A is abnormal, the vehicle body attitude can be controlled by the engine 1 and the brake 20.

A second embodiment differs from the first embodiment in the configuration of the skyhook control unit 33a of the sprung vibration suppression control unit 33. In the following, while the skyhook control unit 33a of the second embodiment is described, the same reference numeral is attached to the same configuration as the first embodiment to omit the description thereof.

The control apparatus for a vehicle of the second embodiment includes three actuators for attaining the sprung attitude control as follows: the engine 1; the brake 20; and S/A 3. Among them, in the skyhook control unit 33a, three rates of the bounce rate, the roll rate, and the pitch rate are set as control objects for S/A 3, the bounce rate and pitch rate are set as the control objects for the engine 1, and the pitch rate is set as the control object for the brake 20. Here, in order to allocate control amounts to a plurality of actuators each having a different operation and control the sprung state, a control amount common to the respective actuators needs to be used. In the second embodiment, the control amount with respect to each actuator can be determined using a sprung speed estimated by the above-described traveling-state estimator 32.

The skyhook control amount in a bounce direction is $FB = CskyB \cdot dB$

The skyhook control amount in a roll direction is $FR = CskyR \cdot dR$

The skyhook control amount in a pitch direction is $FP = CskyP \cdot dP$

FB is transmitted to the engine 1 and S/A 3 as the bounce attitude control amount, while FR is transmitted to the damping force control unit 35 as the roll attitude control amount because it is the control performed only in S/A 3.

Next, the skyhook control amount FP in the pitch direction is described. Usually, the pitch control is performed by the engine 1, the brake 20, and S/A 3. However, when S/A 3 does not operate, the control amounts of the engine 1 and the brake 20 are increased more than during normal time so as to perform the pitch control only by the engine 1 and the brake 20. Alternatively, when the variable range of the damping force becomes sufficiently narrow due to a failure of S/A 3, the pitch control is performed by the engine 1, the brake 20, and S/A 3. However, the control amounts of the engine 1 and the brake 20 are increased more than during normal time so as to reduce the control amount by S/A 3 less than during normal time.

Figure 24:
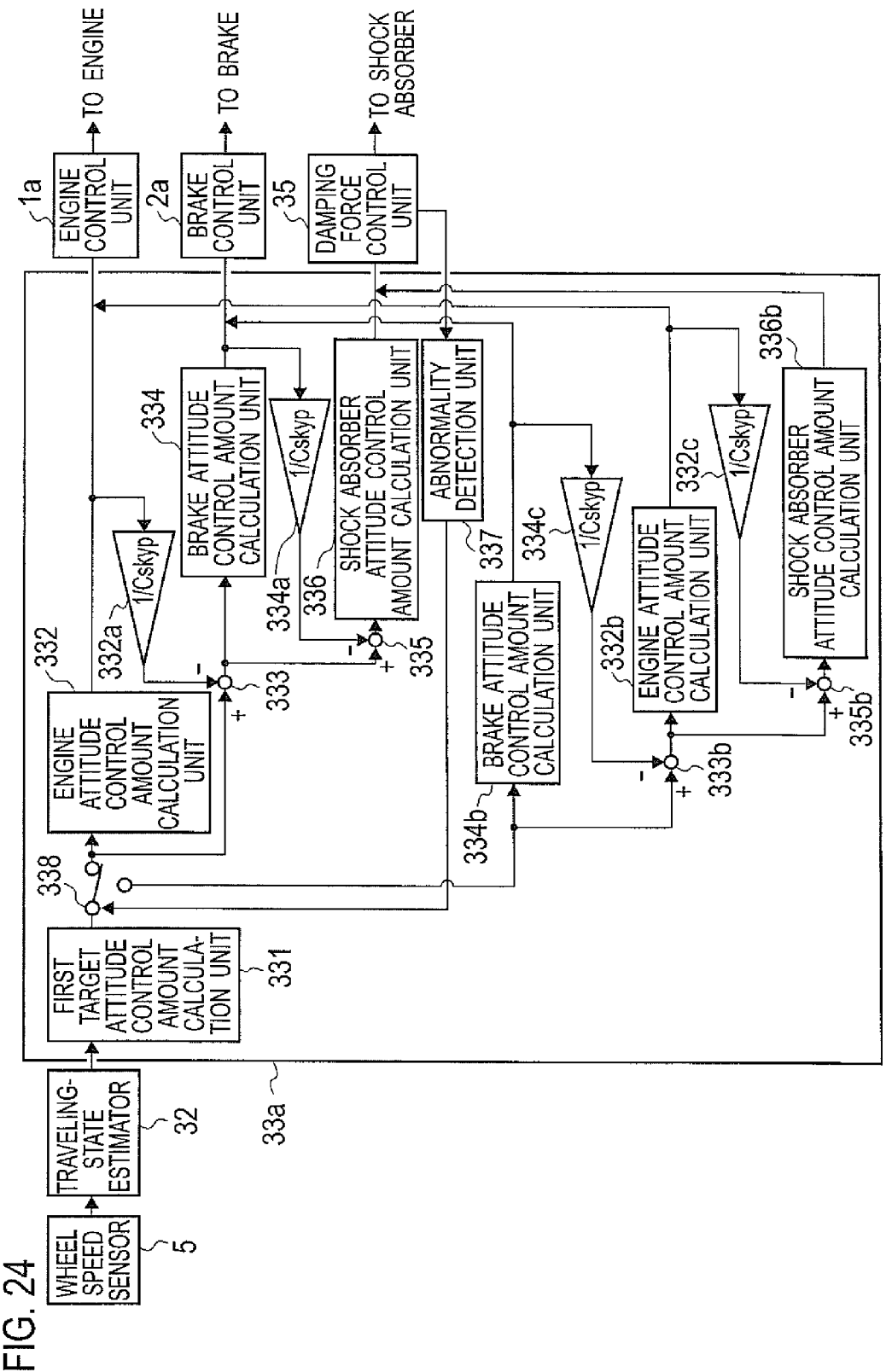
FIG. 24 is a control block graph illustrating each actuator control amount calculation processing when performing pitch control according to the first embodiment.

FIG. 24 is a control block diagram illustrating each actuator control amount calculation processing in performing pitch control according to the second embodiment. In the second embodiment, the skyhook control unit 33a includes a first target attitude control amount calculation unit 331 configured to calculate a target pitch rate that is the first target attitude control amount that is the control amount available in common to all the actuators.

Moreover, the skyhook control unit 33a includes an abnormality detection unit 337 configured to detect an abnormality of S/A 3. When the abnormality detection unit 337 has not detected any abnormality of S/A 3, an engine attitude control amount calculation unit 332 configured to calculate the engine attitude control amount attained by the engine 1, a brake attitude control amount calculation unit 334 configured to calculate the brake attitude control amount attained by the brake 20, and an S/A attitude control amount calculation unit 336 configured to calculate the S/A attitude control amount attained by S/A 3 calculate the respective attitude control amounts.

On the other hand, when the abnormality detection unit 337 has detected an abnormality of S/A 3, an engine attitude control amount calculation unit 332b configured to calculate the engine attitude control amount attained by the engine 1, a brake attitude control amount calculation unit 334b configured to calculate the brake attitude control amount attained by the brake 20, and an S/A attitude control amount calculation unit 336b configured to calculate the S/A attitude control amount attained by S/A 3 calculate the respective attitude control amounts.

In the skyhook control of this system, because operation so as to suppress the pitch rate is the first priority, the first target attitude control amount calculation unit 331 outputs a pitch rate as it is (hereinafter, this pitch rate is referred to as a first target attitude control amount).

The damping force control unit 35 monitors S/A 3, and outputs a fail signal to the abnormality detection unit 337 when S/A 3 stops to operate due to a failure or when the variable range of the damping force becomes narrow (hereinafter, when S/A is abnormal). A switch 338 outputs the first target attitude control amount, which is calculated by the first target attitude control amount calculation unit 331, to the engine attitude control amount calculation unit 332b during normal time, while when the abnormality detection unit 337 detects the fail signal, the switch 338 outputs the same to the brake attitude control amount calculation unit 334.

The engine attitude control amount calculation unit 332 calculates, based on an inputted first target attitude control amount, an engine attitude control amount that is the control amount that can be attained by the engine 1.

In the engine attitude control amount calculation unit 332, a limit value for limiting the engine attitude control amount is set so as not to give any sense of discomfort to the vehicle driver. This limits the engine attitude control amount so as to be within a predetermined range of longitudinal acceleration when converted to a longitudinal acceleration. Accordingly, the engine attitude control amount calculation unit 332 calculates an engine attitude control amount based on the first target attitude control amount, and outputs, when the value thus calculated is equal to or greater than the limit value, an engine attitude control amount that can be attained by the limit value. The engine attitude control amount outputted from the engine attitude control amount calculation unit 332 is outputted as a value obtained by multiplying the pitch rate suppressed by the engine 1 by CskyP. Note that, to a second target attitude control amount calculation unit 333 described later, a value converted into a pitch rate by a conversion unit 332a is outputted. Moreover, the engine control unit 1a calculates an engine torque control amount based on the engine attitude control amount corresponding to the limit value, and outputs the engine torque control amount to the engine 1.

The second target attitude control amount calculation unit 333 calculates a second target attitude control amount that is a deviation between the first target attitude control amount and a value (hereinafter, this value is simply referred also as an engine attitude control amount) obtained by converting the engine attitude control amount into a pitch rate by the conversion unit 332a, and outputs the second target attitude control amount to the brake attitude control amount calculation unit 334.

In the brake attitude control amount calculation unit 334, a limit value for limiting a brake attitude control amount is set so as not to give any sense of discomfort to the vehicle driver, as with the engine 1. This limits the brake attitude control amount so as to be within a predetermined range of longitudinal acceleration when converted to a longitudinal acceleration. Accordingly, the second target attitude control amount calculation unit 333 calculates the brake attitude control amount based on the second target attitude control amount and outputs, when the value thus calculated is equal to or greater than the limit value, a brake attitude control amount that can be attained by the limit value. The brake attitude control amount outputted from the brake attitude control amount calculation unit 334 is outputted as a value obtained by multiplying the pitch rate suppressed by the brake 20 by CskyP. Note that, to a third target attitude control amount calculation unit 335 described later, a value, which is obtained by converting the brake attitude control amount into a pitch rate by a conversion unit 334a, is outputted. Moreover, the brake control unit 2a calculates a braking torque control amount based on the brake attitude control amount corresponding to the limit value, and outputs the braking torque control amount thus calculated to the brake control unit 2.

The third target attitude control amount calculation unit 335 calculates a third target attitude control amount that is a deviation between the second target attitude control amount and a value (hereinafter, this value is simply referred also as a brake attitude control amount) obtained by converting the brake attitude control amount into the pitch rate by the conversion unit 334a, and outputs the third target attitude control amount to an S/A attitude control amount calculation unit 336. The S/A attitude control amount calculation unit 336 outputs a pitch attitude control amount corresponding to the third target attitude control amount. Moreover, the damping force control unit 35 calculates a damping force control amount based on the bounce attitude control amount, the roll attitude control amount, and the pitch attitude control amount (hereinafter, these are collectively referred to as an S/A attitude control amount), and outputs the same to S/A 3.

The brake attitude control amount calculation unit 334b calculates, based on an inputted first target attitude control amount, the brake attitude control amount that is a control amount that can be attained by the brake 20.

Also in the brake attitude control amount calculation unit 334b, a limit value for limiting a brake attitude control amount is set, as with the brake attitude control amount calculation unit 334. However, the limit value of the brake attitude control amount calculation unit 334b is set larger than the limit value of the brake attitude control amount calculation unit 334. This enables to increase the brake attitude control amount and suppress the pitch rate even if the control amount by S/A 3 decreases when S/A is abnormal. To the second target attitude control amount calculation unit 333b, a value converted into the pitch rate by the conversion unit 334c is outputted.

The brake attitude control amount calculation unit 334b calculates a brake attitude control amount so as to increase the control responsiveness of the brake 20 more than during normal time. Because S/A 3 is the portion directly related to the vehicle body attitude, the attitude control by S/A 3 immediately appears as a change in the vehicle body attitude. On the other hand, the attitude control by the brake 20 is slow as compared with the attitude control by S/A 3 because the result of applying an acceleration/deceleration to the vehicle appears as a change in the vehicle body attitude. When S/A is abnormal, the attitude control by S/A 3 might not sufficiently be performed and therefore by increasing the control responsiveness of the brake 20, it is possible to suppress decrease of the responsiveness of the vehicle body attitude control. Moreover, the brake control unit 2a calculates a braking torque control amount based on the brake attitude control amount corresponding to the limit value, and outputs the same to the brake control unit 2.

The second target attitude control amount calculation unit 333b calculates a second target attitude control amount that is a deviation between the first target attitude control amount and a value, which is obtained by converting the brake attitude control amount into the pitch rate by the conversion unit 334c, and outputs the same to an engine attitude control amount calculation unit 332b.

In the engine attitude control amount calculation unit 332b, a limit value for limiting the engine attitude control amount is set, as with the engine attitude control amount calculation unit 332. However, the limit value of the engine attitude control amount calculation unit 332b is set larger than the limit value of the engine attitude control amount calculation unit 332. This enables to increase the engine attitude control amount and suppress the pitch rate even if the control amount by S/A 3 decreases when S/A is abnormal. To the third target attitude control amount calculation unit 335b, a value converted into the pitch rate by the conversion unit 332c is outputted.

The engine attitude control amount calculation unit 332b calculates an engine attitude control amount so as to increase the control responsiveness of the engine 1 more than during normal time. The attitude control by the engine 1 is slow as compared with the attitude control by S/A 3 because a result of applying deceleration to the vehicle appears as a change in the vehicle body attitude. When S/A is abnormal, the attitude control by S/A 3 might not sufficiently be performed and therefore by increasing the control responsiveness of the engine 1, it is possible to suppress decrease of the responsiveness of the vehicle body attitude control. Moreover, the engine control unit 1a calculates an engine torque control amount based on the engine attitude control amount corresponding to the limit value, and outputs the same to the engine 1.

The third target attitude control amount calculation unit 335 calculates a third target attitude control amount that is a deviation between the second target attitude control amount and a value, which is obtained by converting the engine attitude control amount into the pitch rate, and outputs the same to the S/A attitude control amount calculation unit 336. The S/A attitude control amount calculation unit 336 outputs a pitch attitude control amount corresponding to the third target attitude control amount.

The damping force control unit 35 calculates a damping force control amount based on the bounce attitude control amount, the roll attitude control amount, and the pitch attitude control amount (the S/A attitude control amount), and outputs the same to S/A 3.

As described above, during normal time, with regard to the pitch rate, the first target attitude control amount is calculated, and then the engine attitude control amount is calculated, the brake attitude control amount is calculated from the second target attitude control amount that is the deviation between the first target attitude control amount and the engine attitude control amount, and the S/A attitude control amount is calculated from the third target attitude control amount that is the deviation between the second attitude control amount and the brake attitude control amount. Thus, the amount of the pitch rate control performed by S/A 3 can be reduced by the control of the engine 1 and the brake 20, and therefore the controllable range of S/A 3 can be set relatively narrow and the sprung attitude control can be attained with an inexpensive S/A 3.

Moreover, if the control amount by S/A 3 is increased, the damping force would basically increase. An increase of the damping force means a hard suspension property, and therefore when a high-frequency vibration is inputted from the road surface side, the high frequency input is likely to be transmitted, thus impairing the comfort of occupants (hereinafter, referred to as a deterioration of the high frequency vibration characteristic). On the other hand, the actuators, such as the engine 1 and the brake 20, which do not have an influence on the vibration transmission characteristics due to a road surface input, can suppress the pitch rate and reduce the control amount of S/A 3, thereby preventing the deterioration of the high-frequency vibration characteristic. The above-described effects can be obtained by determining the control amount of the engine 1 prior to S/A 3 and by determining the control amount of the brake 20 prior to S/A 3.

Moreover, because the control by the brake 20 causes an increase in the sense of deceleration, by determining the control amount of the engine 1 prior to the brake 20 and reducing the control amount of the brake 20, it is possible to prevent an increase in the sense of deceleration.

On the other hand, when S/A is abnormal, the limit value of the engine torque control amount and the limit value of the braking torque control amount are set larger than during normal time. Thus, the amount of the pitch rate control performed by S/A 3 can be further reduced by the control of the engine 1 and the brake 20, and therefore the sprung attitude control can be attained even when the controllable range becomes narrower due to a failure of S/A 3 than during normal time.

Moreover, the limit value of the engine torque control amount is set higher, and therefore when the control in the acceleration direction is performed by the engine 1, a strong sense of discomfort due to an unintended sense of acceleration might be given to the driver. The sense of discomfort due to the sense of acceleration is stronger than the sense of discomfort due to the sense of deceleration. Therefore, when S/A is abnormal, an increase in the sense of acceleration can be prevented by determining the control amount of the brake 20 prior to the engine 1 and reducing the control amount of the engine 1.

The second embodiment exhibits functional effects listed below.

(10) The brake attitude control amount calculation unit 334b (braking force attitude control amount calculation unit), when an abnormality is detected by the abnormality detection unit 337, calculates a brake attitude control amount controlled by the driving force of the brake 20, based on the first target attitude control amount. The engine attitude control amount calculation unit 332b (driving force attitude control amount calculation unit), when an abnormality is detected by the abnormality detection unit 337, calculates an engine attitude control amount controlled by the driving force of the engine 1, based on the first target attitude control amount and the brake attitude control amount.

That is, even when S/A is abnormal, the vehicle body attitude can be controlled by the brake 20 and the engine 1. In this case, when the control in the acceleration direction is performed by the engine 1, a strong sense of discomfort due to an unintended sense of acceleration might be given to the driver. The sense of discomfort due to the sense of acceleration is stronger than the sense of discomfort due to the sense of deceleration. Therefore, when S/A is abnormal, an increase in the sense of acceleration can be prevented by determining the control amount of the brake 20 prior to the engine 1 and reducing the control amount of the engine 1.

Note that, in the second embodiment, the shock absorber attitude control amount is calculated based on a value obtained by excluding the engine attitude control amount and the brake attitude control amount from the first target attitude control amount, but not limited thereto. For example, the shock absorber attitude control amount may be calculated based on a rate of the first target attitude control amount, the engine attitude control amount, and the brake attitude control amount or the shock absorber attitude control amount may be calculated from a map with the above-described three control amounts as parameters, other than the rate.

Moreover, although in the second embodiment, an example of using the engine as the driving power source is shown, the driving power source is a travelling motor in the case of an electric vehicle, and an engine and a motor generator in the case of a hybrid vehicle, and also from the view point of controlling the driving force, the driving force control may be performed using a transmission or the like interposed between a driving power source and a drive wheel.

(11) The engine attitude control amount calculation unit 332b calculates an engine attitude control amount based on a value obtained by excluding the brake attitude control amount from the first target attitude control amount. Accordingly, because the engine attitude control amount can be reduced by the brake attitude control amount, the sense of acceleration can be reduced.

(12) The brake attitude control amount calculation units 334 and 334b have a limit value for limiting the brake attitude control amount to a predetermined value, and the brake attitude control amount calculation unit 334b increases the limit value when an abnormality is detected by the abnormality detection unit 337.

Because the amount of the pitch rate control performed by S/A 3 can be further reduced by the control of the brake 20, the sprung attitude control can be attained even when the controllable range becomes narrower due to a failure of S/A 3 than during normal time.

(13) The engine attitude control amount calculation units 332 and 332*b* have a limit value for limiting the engine attitude control amount to a predetermined value, and the engine attitude control amount calculation unit 332*b* increases the limit value when an abnormality is detected by the abnormality detection unit 337.

Because the amount of the pitch rate control performed by S/A 3 can be further reduced by the control of the engine 1, the sprung attitude control can be attained even when the controllable range becomes narrower due to a failure of S/A 3 than during normal time.

(14) The brake attitude control amount calculation unit 334*b*, when an abnormality is detected by the abnormality detection unit 337, calculates a brake attitude control amount so as to increase the control responsiveness of the braking force of the brake 20 than when an abnormality has not been detected yet.

By increasing the control responsiveness of the braking force of the brake 20, it is possible to suppress deterioration of the responsiveness of the vehicle body attitude control due to insufficient attitude control by S/A 3.

(15) The engine attitude control amount calculation unit 332*b*, when an abnormality is detected by the abnormality detection unit 337, calculates an engine attitude control amount so as to increase the control responsiveness of the driving force of the engine 1 more than when an abnormality has not been detected yet.

By increasing the control responsiveness of the driving force of the engine 1, it is possible to suppress deterioration of the responsiveness of the vehicle body attitude control due to insufficient attitude control by S/A 3.

The invention claimed is:

1. A control apparatus for a vehicle comprising:
   a braking force attitude control amount calculation unit configured to calculate a braking force attitude control amount controlled by a braking force of the vehicle so that an attitude of a vehicle body becomes a target attitude;
   a driving force attitude control amount calculation unit configured to calculate a driving force attitude control amount controlled by a driving force of the vehicle so that the attitude of the vehicle body becomes a target attitude;
   a damping force control unit configured to control a damping force of a shock absorber based on the driving force attitude control amount and the braking force attitude control amount;
   a traveling state detector configured to detect a traveling state of the vehicle;
   a target attitude control amount calculation unit configured to calculate a target attitude control amount of the vehicle body based on the traveling state; and
   an abnormality detector configured to detect an abnormality of the shock absorber, wherein
   the driving force attitude control amount calculation unit, when an abnormality is detected by the abnormality detector, calculates a driving force attitude control amount controlled by the driving force of the vehicle, based on the target attitude control amount, and wherein
   the braking force attitude control amount calculation unit, when an abnormality is detected by the abnormality detector, calculates a braking force attitude control amount controlled by the braking force of the vehicle, based on the target attitude control amount and the driving force attitude control amount.

2. The control apparatus for a vehicle according to claim 1, wherein the braking force attitude control amount calculation unit, when an abnormality is detected by the abnormality detector, calculates the braking force attitude control amount based on a value obtained by excluding the driving force attitude control amount from the target attitude control amount.

3. The control apparatus for a vehicle according to claim 1, wherein:
   the driving force attitude control amount calculation unit has a limit value for limiting the driving force attitude control amount to a predetermined value, and
   the driving force attitude control amount calculation unit increases the limit value when an abnormality is detected by the abnormality detector.

4. The control apparatus for a vehicle according to claim 1, wherein:
   the braking force attitude control amount calculation unit has a limit value for limiting the braking force attitude control amount to a predetermined value, and
   the braking force attitude control amount calculation unit increases the limit value when an abnormality is detected by the abnormality detector.

5. The control apparatus for a vehicle according to claim 1, wherein the driving force attitude control amount calculation unit, when an abnormality is detected by the abnormality detector, calculates the driving force attitude control amount so as to increase a limit value of the driving force more than when an abnormality has not been detected yet.

6. The control apparatus for a vehicle according to claim 1, wherein the braking force attitude control amount calculation unit, when an abnormality is detected by the abnormality detector, calculates the braking force attitude control amount so as to increase a limit value of the braking force more than when an abnormality has not been detected yet.

7. A control apparatus for a vehicle comprising:
   a driving force attitude control amount calculation unit configured to calculate a driving force attitude control amount controlled by a driving force of the vehicle so that an attitude of a vehicle body becomes a target attitude;
   a braking force attitude control amount calculation unit configured to calculate a braking force attitude control amount controlled by a braking force of the vehicle so that the attitude of the vehicle body becomes a target attitude;
   a damping force control unit configured to control a damping force of a shock absorber based on the driving force attitude control amount and the braking force attitude control amount;
   a traveling state detector configured to detect a traveling state of the vehicle;
   a target attitude control amount calculation unit configured to calculate a target attitude control amount of the vehicle body based on the traveling state; and
   an abnormality detector configured to detect an abnormality of the shock absorber, wherein
   the braking force attitude control amount calculation unit, when an abnormality is detected by the abnormality detector, calculates a braking force attitude control amount controlled by a braking force of the vehicle based on the target attitude control amount, and wherein
   the driving force attitude control amount calculation unit, when an abnormality is detected by the abnormality detector, calculates a driving force attitude control amount controlled by a driving force of the vehicle, based on the target attitude control amount and the braking force attitude control amount.

8. The control apparatus for a vehicle according to claim 7, wherein the driving force attitude control amount calculation unit, when an abnormality is detected by the abnormality detector, calculates the driving force attitude control amount based on a value obtained by excluding the braking force attitude control amount from the target attitude control amount.

9. The control apparatus for a vehicle according to claim 7, wherein:
the braking force attitude control amount calculation unit has a limit value for limiting the braking force attitude control amount to a predetermined value, and
the braking force attitude control amount calculation unit increases the limit value when an abnormality is detected by the abnormality detector.

10. The control apparatus for a vehicle according to claim 7, wherein:
the driving force attitude control amount calculation unit has a limit value for limiting the driving force attitude control amount to a predetermined value, and
the driving force attitude control amount calculation unit increases the limit value when an abnormality is detected by the abnormality detector.

11. The control apparatus for a vehicle according to claim 7, wherein the braking force attitude control amount calculation unit, when an abnormality is detected by the abnormality detector, calculates the braking force attitude control amount so as to increase a limit value of the braking force more than when an abnormality has not been detected yet.

12. The control apparatus for a vehicle according to claim 7, wherein the driving force attitude control amount calculation unit, when an abnormality is detected by the abnormality detector, calculates the driving force attitude control amount so as to increase a limit value of the driving force more than when an abnormality has not been detected yet.

13. A control apparatus for a vehicle comprising:
a controller configured to calculate a braking force attitude control amount, a driving force attitude control amount, and a damping force attitude control amount so that an attitude of a vehicle body becomes a target attitude, the target attitude being a pitch rate;
a friction brake that generates a braking force corresponding to the braking force attitude control amount;
a driving source that generates a driving force corresponding to the driving force attitude control amount;
a shock absorber that generates a damping force corresponding to the damping force attitude control amount;
a sensor configured to detect a traveling state of the vehicle; and
an abnormality detector configured to detect an abnormality of the shock absorber, wherein
the controller, when an abnormality is detected by the abnormality detector, calculates a driving force attitude control amount based on a target attitude control amount of the vehicle body calculated from the traveling state, and also calculates a braking force attitude control amount based on the target attitude control amount and the driving force attitude control amount.

14. A control method for a vehicle comprising the steps of:
calculating, by a controller, a braking force attitude control amount controlled by a braking force, a driving force attitude control amount controlled by a driving force, and a damping force attitude control amount controlled by a damping force of a shock absorber so that an attitude of a vehicle body becomes a target attitude, the target attitude being a pitch rate;
calculating, by the controller, when an abnormality occurs in the shock absorber, a target attitude control amount based on a traveling state of the vehicle;
calculating, by the controller, a driving force attitude control amount based on the target attitude control amount; and
controlling, by the controller, a control amount, which cannot be attained by the driving force attitude control amount, using a braking force with respect to the target attitude control amount.

15. A control apparatus for a vehicle comprising:
a controller configured to calculate a driving force attitude control amount, a braking force attitude control amount, and a damping force attitude control amount so that an attitude of a vehicle body becomes a target attitude, the target attitude being a pitch rate;
a driving source that generates a driving force corresponding to the driving force attitude control amount;
a friction brake that generates a braking force corresponding to the braking force attitude control amount;
a shock absorber that generates a damping force corresponding to the damping force attitude control amount;
a sensor configured to detect a traveling state of the vehicle; and
an abnormality detector configured to detect an abnormality of the shock absorber, wherein
the controller, when an abnormality is detected by the abnormality detector, calculates a braking force attitude control amount based on a target attitude control amount of the vehicle body calculated from the traveling state, and also calculates a driving force attitude control amount based on the target attitude control amount and the braking force attitude control amount.

16. A control method for a vehicle, comprising the steps of:
calculating, by a controller, a driving force attitude control amount controlled by a driving force, a braking force attitude control amount controlled by a braking force, and a damping force attitude control amount controlled by a damping force of a shock absorber so that an attitude of a vehicle body becomes a target attitude, the target attitude being a pitch rate;
calculating, by the controller, when an abnormality occurs in the shock absorber, a target attitude control amount based on a traveling state of the vehicle;
calculating, by the controller, the braking force attitude control amount based on the target attitude control amount; and
controlling, by the controller, a control amount, which cannot be attained by the braking force attitude control amount, using a driving force with respect to the target attitude control amount.

* * * * *